United States Patent
Jawa et al.

(10) Patent No.: US 9,111,087 B2
(45) Date of Patent: Aug. 18, 2015

(54) METHOD AND SYSTEM FOR FACILITATING REPLACEMENT OF SYSTEM CALLS

(71) Applicant: VMware, Inc., Palo Alto, CA (US)

(72) Inventors: Manish Jawa, Bangalore (IN); Haim Tebeka, Palo Alto, CA (US); Craig Newell, Cambridge, MA (US)

(73) Assignee: VMWARE, INC., Palo Alto, CA (US)

( * ) Notice: Subject to any disclaimer, the term of this patent is extended or adjusted under 35 U.S.C. 154(b) by 26 days.

(21) Appl. No.: 13/756,347

(22) Filed: Jan. 31, 2013

(65) Prior Publication Data

US 2014/0059525 A1 Feb. 27, 2014

Related U.S. Application Data

(60) Provisional application No. 61/692,857, filed on Aug. 24, 2012.

(51) Int. Cl.

| | |
|---|---|
| G06F 9/44 | (2006.01) |
| G06F 21/54 | (2013.01) |
| G06F 9/445 | (2006.01) |
| G06F 21/31 | (2013.01) |
| G06F 21/60 | (2013.01) |
| G06F 21/53 | (2013.01) |
| H04W 12/02 | (2009.01) |
| H04L 29/06 | (2006.01) |
| H04W 12/00 | (2009.01) |

(52) U.S. Cl.
CPC ............ *G06F 21/54* (2013.01); *G06F 9/44521* (2013.01); *G06F 21/31* (2013.01); *G06F 21/53* (2013.01); *G06F 21/602* (2013.01); *G06F 21/604* (2013.01); *H04W 12/02* (2013.01); *G06F 2221/2107* (2013.01); *G06F 2221/2143* (2013.01); *G06F 2221/2149* (2013.01); *H04L 63/0272* (2013.01); *H04W 12/00* (2013.01)

(58) Field of Classification Search
None
See application file for complete search history.

(56) References Cited

U.S. PATENT DOCUMENTS

| | | | | |
|---|---|---|---|---|
| 6,026,235 | A  * | 2/2000 | Shaughnessy | 717/127 |
| 6,212,632 | B1 * | 4/2001 | Surine et al. | 713/2 |
| 6,405,316 | B1 * | 6/2002 | Krishnan et al. | 713/190 |
| 6,463,583 | B1 * | 10/2002 | Hammond | 717/162 |
| 6,529,985 | B1 * | 3/2003 | Deianov et al. | 710/260 |
| 6,735,774 | B1 * | 5/2004 | Krishnaswamy | 719/328 |
| 6,959,441 | B2 * | 10/2005 | Moore | 719/328 |
| 7,111,323 | B1 | 9/2006 | Bhatia et al. | |
| 7,296,274 | B2 * | 11/2007 | Cohen et al. | 719/315 |
| 7,552,446 | B1 | 6/2009 | Sosnovsky et al. | |

(Continued)

OTHER PUBLICATIONS

Os X ABI Mach-O File Format Reference, located at https://developer.apple.com/.../MachORuntime/Reference/Reference.html Feb. 4, 2009.*

(Continued)

*Primary Examiner* — Isaac T Tecklu
*Assistant Examiner* — Hossain Morshed

(57) ABSTRACT

One embodiment of the present invention provides a system for facilitating replacement of a system call in an application with a customized function call. During operation, the system re-links the application's executable file with additional code or dynamically injects the additional code to the application's executable file during run time. The additional code can change a pointer in a table which indicates addresses of imported functions so that the pointer indicates an address of the customized function call.

82 Claims, 15 Drawing Sheets

(56) References Cited

U.S. PATENT DOCUMENTS

| | | | |
|---|---|---|---|
| 7,565,665 B2* | 7/2009 | Forin et al. | 719/331 |
| 7,792,546 B2 | 9/2010 | Toy et al. | |
| 7,992,156 B1* | 8/2011 | Wang | 719/328 |
| 8,233,882 B2* | 7/2012 | Rogel | 455/411 |
| 8,769,643 B1 | 7/2014 | Ayed | |
| 2004/0006637 A1* | 1/2004 | Kuacharoen et al. | 709/231 |
| 2005/0108721 A1* | 5/2005 | Oshima et al. | 719/310 |
| 2005/0108733 A1* | 5/2005 | Bermudez et al. | 719/328 |
| 2005/0246705 A1* | 11/2005 | Etelson et al. | 718/100 |
| 2006/0161973 A1* | 7/2006 | Royer et al. | 726/8 |
| 2008/0034071 A1 | 2/2008 | Wilkinson et al. | |
| 2008/0134347 A1 | 6/2008 | Goyal et al. | |
| 2008/0250400 A1* | 10/2008 | Vertes | 717/158 |
| 2008/0282266 A1 | 11/2008 | Kabanov | |
| 2009/0164994 A1 | 6/2009 | Vasilevsky et al. | |
| 2009/0227274 A1 | 9/2009 | Adler et al. | |
| 2009/0240947 A1 | 9/2009 | Goyal et al. | |
| 2009/0249335 A1 | 10/2009 | Vasilevsky et al. | |
| 2010/0299719 A1 | 11/2010 | Burks et al. | |
| 2010/0306547 A1 | 12/2010 | Fallows et al. | |
| 2010/0333088 A1 | 12/2010 | Rogel et al. | |
| 2011/0030047 A1 | 2/2011 | Gao et al. | |
| 2011/0219234 A1* | 9/2011 | Bogner | 713/175 |
| 2011/0252240 A1 | 10/2011 | Freedman et al. | |
| 2011/0276987 A1 | 11/2011 | Pope et al. | |
| 2012/0036552 A1 | 2/2012 | Dare et al. | |
| 2012/0149338 A1 | 6/2012 | Roundtree | |
| 2012/0204126 A1 | 8/2012 | Yoshimura | |
| 2013/0007848 A1 | 1/2013 | Chaskar et al. | |
| 2013/0091543 A1* | 4/2013 | Wade et al. | 726/1 |
| 2013/0160072 A1 | 6/2013 | Reus et al. | |
| 2013/0167250 A1 | 6/2013 | Balasubramanian | |
| 2013/0239197 A1 | 9/2013 | Kato et al. | |
| 2014/0007048 A1 | 1/2014 | Qureshi et al. | |
| 2014/0007183 A1 | 1/2014 | Qureshi et al. | |
| 2014/0007205 A1 | 1/2014 | Oikonomou | |
| 2014/0032491 A1* | 1/2014 | Neerincx et al. | 707/610 |
| 2014/0059525 A1 | 2/2014 | Jawa et al. | |
| 2014/0059573 A1* | 2/2014 | Jawa et al. | 719/331 |
| 2014/0059642 A1 | 2/2014 | Deasy et al. | |
| 2014/0059703 A1 | 2/2014 | Hung et al. | |
| 2014/0282869 A1 | 9/2014 | Dabbiere | |

OTHER PUBLICATIONS

Mach-Developer Library—Mach-O Programming Topics https://developer.apple.com/library/mac/documentation/DeveloperTools/Conceptual/Mach OTopics/1-Articles/indirect_addressing.html Feb. 4, 2009.*

Stephen Deasy et al., "Method and System for Facilitating Isolated Workspace for Applications", U.S. Appl. No. 13/595,881, filed Aug. 27, 2012.

Manish Jawa et al., "Method and System for Identifying and Replacing System Calls", U.S. Appl. No. 13/775,047, filed Feb. 22, 2013.

Perry Hung et al., "Method and System to Impose Enterprise Security Mechanisms Throughout a Mobile Application Lifecycle", U.S. Appl. No. 13/918,511, filed Jun. 14, 2013.

Lozzo, Vincenzo, "Let your Mach-O fly," Feb. 18, 2009, 42 pages.

Riley, Ryan, et al., "Multi-Aspect Profiling of Kernel Rootkit Behavior," ACM, 2009, 42 pages.

Sysmagazine, "Redirection of functions in Mach-O libraries," published 3 years from retrieved date of May 12, 2014, 28 pages.

Schuetz, David, "The IOS MDM Protocol," Intrepidus Group, Inc., Aug. 3, 2011, 29 pages.

"Over-the-Air Profile Delivery Concepts," http://developer.apple.com/library/ios/#documentation/networkinginternet/conceptual/iphoneotaconfiguration/OTASecurity/OTSecurity.html, Feb. 12, 2013, 6 pages.

"Developer Forums: Retrieving Certificate from Keychain," p. 2, https://devforums.apple.com/thread/336?start=25&tstart=0, Mar. 20, 2013, 5 pages.

"Developer Forums: Retrieving Certificate from Keychain," p. 1, https://devforums.apple.com/message/11142#11142, Mar. 20, 2013, 13 pages.

Careers 2.0 by stackoverflow, "Verify/Check to see if a Configuration Profile has been installed on IPhone," http://stackoverflow.com/questions/2195673/verify-check-to-see-if-a-configuration-profile-has-been-installed-on-iphone, Mar. 20, 2013, 2 pages.

Harvey Tuch, et al., "Configuration Profile Validation on IOS Using SSL and Redirect," U.S. Appl. No. 13/848,347, filed Mar. 21, 2013.

U.S. Appl. No. 13/756,347, filed Jan. 31, 2013, entitled, "Method and System for Facilitating Replacement of System Calls."

* cited by examiner

METHOD AND SYSTEM FOR FACILITATING REPLACEMENT OF SYSTEM CALLS

CROSS-REFERENCE TO RELATED APPLICATIONS

The present application claims priority to U.S. Provisional Patent Application No. 61/692,857, filed on Aug. 24, 2012 and entitled "Secure Inter-Process Communication and Virtual Workspaces on Mobile Device Operating Systems," the entire contents of which are hereby incorporated by reference.

The present application is related to U.S. patent application Ser. No. 13/595,881, filed 27 Aug. 2012 and entitled "Method and System for Facilitating Isolated Workspace for Applications," the entire contents of which are hereby incorporated by reference.

BACKGROUND

Over the past decade, the mobile device has evolved from a voice-centric device into a mobile personal computer. No longer just a device for voice communications, the mobile device has become a multitasking tool, useful for activities such as emailing and web browsing. The current trends for mobile devices are toward the mimicking of desktop functionality. As a result, mobile devices are becoming enterprise endpoints with rich applications and core enterprise connectivity. Because an enterprise may need to specifically provision a mobile device for accessing restricted data, an employee may either have to sacrifice a personal device for dedicated enterprise use or carry two devices, one personal and one for enterprise use, to work.

From an end-user perspective, it is desirable to consolidate the personal mobile device with the enterprise device. Virtualization offers an opportunity to provide a convenient solution by preserving isolation of environments without requiring a second physical enterprise device. Supporting a personal environment and a work environment through virtualization on a personal mobile device represents an attractive alternative to existing solutions involving multiple physical mobile devices. The rapid pace of hardware advances in mobile devices over the past several years has led to a class of mobile devices with resources capable of supporting multiple environments (e.g., one or more virtual phones) through virtualization.

However, given the current particular complexities of the mobile environment from technical, infrastructure, and business perspectives, providing sufficient virtualization capabilities on mobile devices remains challenging. For example, mobile service carriers typically do not give enterprises or end users full access to its hardware resources, for security or commercial reasons. In addition, not all mobile-device operating systems are virtualization-friendly. They may not provide sufficient privileged access to the system resources and impose stringent restrictions on the applications. For example, certain operating systems may not allow (or provide limited ability for) more than one process to execute at a time, and may not provide any inter-process call mechanism.

Furthermore, applications executing in operating systems with such restrictions may not be able to load customized system functions or otherwise take control of the operating system's system calls. Without control over the system calls, it can be difficult to implement and enforce enterprise policy on mobile devices used by an enterprise's employees. Hence, it remains a challenge to unify a user's work-related enterprise functionalities and his personal-use functionalities on the same mobile device.

SUMMARY

One embodiment of the present invention provides a system for facilitating replacement of a system call in an application with a customized function call. During operation, the system re-links the application's executable file with additional code or dynamically injects the additional code to the application's executable file during run time. The additional code can change a pointer in a table which indicates addresses of imported functions so that the pointer indicates an address of the customized function call.

In a variation of this embodiment, the system further computes a new signature for the executable file and replacing an existing signature in the object file with the new signature.

In a variation of this embodiment, to inject dynamically the additional code, the system adds a load command to the executable file and determines whether the executable file includes sufficient unused space which can accommodate the load command.

In a further variation, responsive to the executable file including sufficient unused space, the system shifts, in a header section of the executable file, at least one existing load command which does not contain dependency information to make space for the added load command.

In a further variation, responsive to the executable file not including sufficient unused space, the system moves a portion of the executable file to make space for the added load command.

In a further variation, the system changes offsets in the moved portion of the executable file containing executable code.

In a further variation, the executable file imports a library, and the system changes a particular pointer in an address table associated with the library so that the pointer points to a customized function call which replaces a call in the library.

In a further variation, the system determines a relocation offset value corresponding to a difference between a preferred base address and an actual load address for the library which is loaded as part of a shared cache, and adds the relocation offset value to a preferred base address described in a load command for the library.

In a variation of this embodiment, the system changes a pointer to the system call in all import tables of all module dependencies of the executable file, whereby each import table with a pointer to the system call has the pointer changed to indicate the address of the customized function call.

In a variation of this embodiment, the code when executed by a processor causes the processor to change both a first pointer in a non-lazy symbol table that stores function pointers indicating addresses determined at launch time and a second pointer in a lazy symbol table that stores function pointers indicating addresses determined on first invocation of each function.

BRIEF DESCRIPTION OF THE FIGURES

In the figures, like reference numerals refer to the same figure elements.

DETAILED DESCRIPTION

Figure 1:
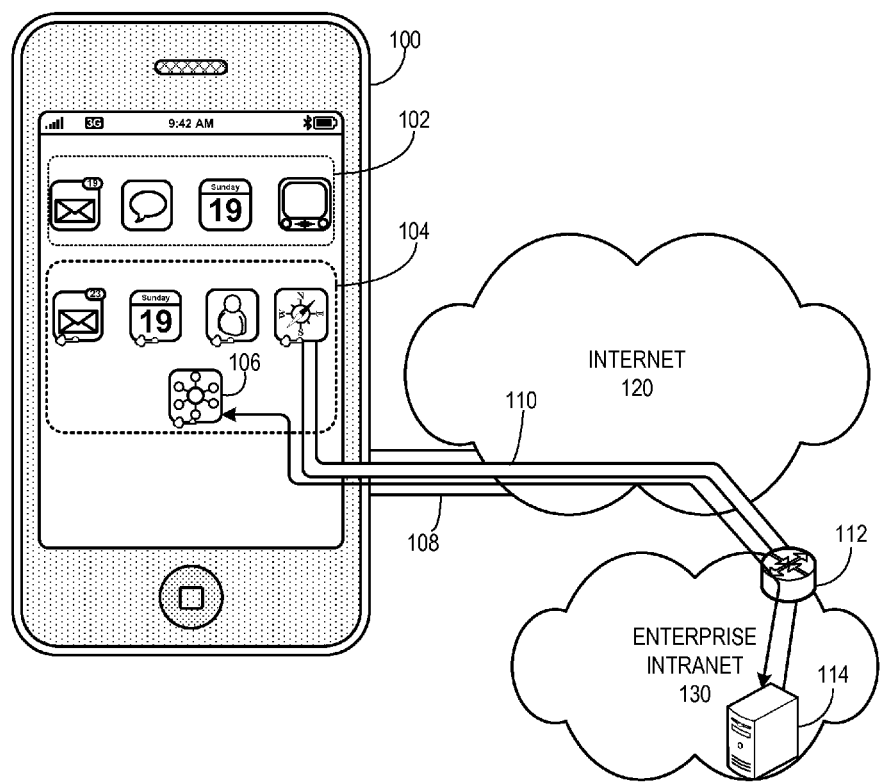
FIG. 1 illustrates an exemplary isolated workspace on a mobile phone, in accordance with an embodiment.

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the claims.

Overview

Embodiments of the system described herein solve the problem of replacing or interposing certain system library calls with customized system calls in a Mach-O file is solved by i) modifying the Mach-O file offline to cause the operating system loader to load a hook and injection manager module before loading any other modules with dependencies, and ii) upon application launch, replacing all function pointer values for interposed system library calls, both in the application binary file and dependent library modules. By changing the function pointer for a conventional system library call before execution, the hook and injection manager can replace the conventional system library call with a customized function call. Further, although executable code within library modules may also make system library calls, the techniques disclosed herein also change the function pointers for library modules before the code can make any such system call. Thus, all such system calls are preemptively redirected to customized functions, regardless of whether the system call is made from within the application binary or from within a library module.

Note that a shared library is a collection of modules, and a module is the smallest unit of machine code and data that can be linked independently of other units of code. An operating system's dynamic loader loads shared libraries when an application is launched. From a high-level perspective, embodiments described herein allow enterprise applications to execute alongside personal applications on the same mobile device without running a conventional virtual machine. These enterprise applications can reside within a secure, exclusive "virtual workspace" that is isolated from other regular applications. In particular, a wrapping utility tool can modify a generic application, which results in a "wrapped" application with substituted system library calls. These substitute system calls, referred to as "wrapper," become part of the application and serve as a policy enforcement mechanism. For example, with a wrapper, certain enterprise applications may communicate with an enterprise intranet via a virtual private network (VPN) tunnel, and may be precluded from using the mobile device's regular, unencrypted data connectivity. The policy enforcement component, or wrapper, of each enterprise application running in the workspace can also require that all the files associated with the enterprise applications are encrypted.

The wrapping utility tool inserts the hook and injection manager into the application's object file that, upon launching the application, the operating system loader loads the hooking and injection manager before any module with dependencies. After the dynamic loader loads the application binary file and dependent library modules, the hook and injection manager dynamically loads an interposition library. An initialization function in the interposition library then scans the rest of the loaded code and modifies function pointers for certain system calls so that the function pointers point to customized system functions. The hook and injection manager substitutes a conventional system call with a customized system call by changing the value of the function pointer in an import table. The hook and injection manager modifies all function pointers, whether found in import tables belonging to the application binary or belonging to a library module, thereby taking control of system calls and enforcing the enterprise policy.

When the application binary is initially loaded at runtime, the hook and injection manager searches for a symbol representing the system call in a symbol table. After finding the symbol table entry, the hook and injection manager obtains a symbol table index value. The hook and injection manager uses the symbol table index value to search through an indirect table for an import table index value, and uses the import table index value to locate the proper table entry in the import table. The hook and injection manager then overwrites the address for the conventional system call in the import table with the address for the customized system call.

The following disclosure uses enterprise applications and Mach-O object files as examples. However, embodiments of the present application are applicable in any environment where a set of applications (which may or may not be enterprise applications) can benefit from a secure, isolated execution environment. Furthermore, the term "mobile device" can refer to, but is not limited to, mobile phones, personal digital assistant (PDA) devices, tablet computers, and portable computers.

Isolated Workspace

As previously discussed, embodiments described herein facilitate implementation of a "virtual workspace" to provide isolation between a personal and enterprise environment in a mobile device. Such a workspace provides a secure and exclusive environment in which a collection of enterprise applications execute. For example, an enterprise's IT department may offer certain enterprise applications to enable an employee to access the enterprise's confidential or restricted information using the employee's personal mobile device (e.g., by accessing a remote server controlled by the enterprise or locally storing such information in a secure manner on the mobile device). Examples of such applications include an email application, phone book, document management program, calendar, specialized web browser, and chat/conferencing application. The workplace provides an isolated environment for these enterprise applications to run and prevents unauthorized applications on the same mobile device from accessing the data used by the enterprise applications.

To facilitate this isolated workspace, certain embodiments of enterprise applications satisfy two conditions: (1) they use an exclusive, secure network connection (e.g., VPN, etc.) to access resources at the enterprise (e.g., data, application servers, etc.) and that is not accessible to other applications on the same mobile device; and (2) they can share certain local resources (such as file storage and memory) among themselves, but these resources are not accessible to other applications.

As described below, to satisfy these conditions, an enterprise prepares enterprise applications for installation on a mobile device by performing an offline wrapping process on them that replaces or interposes on certain system library calls (typically related with I/O) with customized calls by "injecting" into the enterprise application, for example, dynamically-linked libraries including these customized calls (i.e., these libraries referred to as a "wrapper" around the original enterprise application) or pre-linking with static libraries containing these customized calls. For example, in one embodiment, the enterprise utilizes an offline utility tool to modify the binary executable (e.g., Mach-O file in an Apple iOS embodiment, etc.) of an enterprise application in order to cause the enterprise application to load one or more specified dynamically linked libraries (e.g., .dylib file in an Apple iOS embodiment) when the enterprise application is launched on the mobile device.

Such dynamically linked libraries are then included as part of the enterprise application's archive file (e.g., .ipa file in an Apple iOS embodiment). The customized calls included in the dynamically linked libraries can ensure that the application's I/O functions (e.g., network communication and file access) comply with enterprise policies. In addition, a special local application installed on the user's mobile device, referred to herein as an "application management agent," maintains and updates the enterprise policies locally on the mobile device (e.g., by communicating with a remote management server at the enterprise) and, in certain embodiments, also provides an enterprise application catalog for the end user to select, download and install enterprise applications into the workspace of the mobile device.

Note that although the present disclosure uses "workspace" as a shorthand for this isolated and secure execution environment for enterprise applications, "workspace" is only a logical abstraction that refers to a collection of enterprise applications. In actual implementations, there may or may not be an actual displayed workspace on a graphic user interface (such as a folder). In addition, the present disclosure uses the phrase "accessing a workspace" in a generic sense and does not necessarily require a user to access a folder. A user can access a workspace by merely accessing one of the enterprise applications that belongs to the workspace.

FIG. 1 illustrates an exemplary isolated workspace on a mobile device, in accordance with an embodiment. In this example, a mobile device 100 displays its applications as icons on a touch screen. A group of regular (e.g., personal) applications 102 can include, for example, an email program, a text messaging program, a calendar program, or an online video viewing program. Mobile device 100 also displays a set of enterprise applications (denoted by a small key symbol on the lower left corner of each icon) that operate within a workspace 104.

It should be recognized that the display of FIG. 1 is merely exemplary and that in alternative embodiments, visualization of workspace 104 on the screen of mobile device 100 may differ. For example, in one alternative embodiment, icons representing enterprise application operating within workspace 104 may be intermingled with icons for regular or personal applications 102. In other alternative embodiments, icons representing enterprise applications operating within workspace 104 may be separated from icons for regular or personal applications, for example, through the use of a finger swipe action that takes the user from a screen displaying only personal or regular application 102 to a separate screen displaying only enterprise applications in workspace 104. Examples of enterprise applications in workspace 104 include, for example, an enterprise email program, an enterprise calendar program, an enterprise directory, or an enterprise browser.

Also included in workspace 104 is an application management agent 106 (as previously discussed), which serves as a local repository of security and access-control policies for all the enterprise applications. For example, application management agent 106 may periodically communicate (e.g., on behalf of or at the request of running enterprise applications) with a remote application management server 114 at the enterprise to obtain up-to-date security and access control policies. It should be recognized that although the embodiment of FIG. 1 depicts an icon on application management agent 106 on the screen of mobile device 100 as an application that is not required to run during the execution of enterprise applications, alternative embodiments may implement application management agent 106 as a service running on mobile device 100 rather than an icon-based application that is launched by the user by selecting an icon on the screen of mobile device 100 (or by other enterprise applications using the mobile operating system's URL handler functionality).

In addition to voice services, as depicted in the embodiment of FIG. 1, mobile device 100 maintains some type of data connectivity 108 to a public network, such as Internet 120. Data connectivity 108 can be a cellular data communication channel or a wireless network connection (WiFi). To facilitate secure communication between enterprise applications operating within workspace 104 and an enterprise intranet 130, an enterprise application may maintain a VPN tunnel 110 to an enterprise gateway router 112. VPN tunnel 110 provides a secure communication channel between an enterprise application and enterprise intranet 130. In one embodiment, as further discussed below, the customized system calls included with an enterprise application (e.g., within the wrapper) are responsible for maintaining a VPN tunnel (such as VPN tunnel 110) and ensuring that all network communication is routed through the VPN tunnel.

Furthermore, since VPN tunnel 110 is specific to a particular enterprise application, VPN tunnel 110 is not available to other applications outside workspace 104. This exclusive availability of VPN tunnel 110 to a particular enterprise application ensures that all data communication from and to the enterprise application operating within workspace 104 is secure and encrypted. In addition, since the VPN tunnels are enterprise application-specific, gateway router 112 can obtain application-specific access history, which in turn enhances the security of intranet 130. Note that although VPN tunnel 110 is established within data connectivity 108 which is available to all applications on mobile device 100, the content carried in VPN tunnel 110 remains confidential and is only accessible to the enterprise application responsible for VPN tunnel 110.

In certain embodiments, application management agent 106 can run on an as-needed basis. That is, application management agent 106 runs only when an enterprise application calls it (e.g., to exchange authentication credentials, cryptographic keys and other data relating to working with the secured workspace, etc.) or when a user launches it. In other embodiments, application management agent 106 can remain running as long as there is at least one enterprise application running (however, this option might not be available in operating systems that do not allow or only provide limited concurrently running processes). Optionally, application management agent 106 can start automatically as a service as part of the boot-up sequence of mobile device 100. Applicant management agent 106 is responsible for maintaining and updating enterprise policies, such as security requirements and access control. In addition, application management agent 106 can, from time to time or on an as-needed basis, communicate with application management server 114, which in one embodiment can reside in enterprise intranet 130. Application management server 114 can distribute updates to the enterprise policies and remotely manage the enterprise applications via application management agent 106.

Managing Applications within Workspace

In certain embodiments, enterprise applications within workspace 104 comply with the security and isolation requirements and enterprise policies maintained by application management agent 106 and are either (1) applications specifically developed (e.g., using a provided SDK and APIs) to enforce enterprise policies (sometimes referred to as "containerized applications") and (2) conventional, generic applications that have been "wrapped" (as opposed to having been specifically designed) to enforce enterprise policies (sometimes referred to as "wrapped applications"). Containerized applications may include applications developed in-house by the enterprise specifically to be used in the workspace, such as an expense report generating application for the enterprise's sales department or a financial forecasting application for the enterprise's finance team. Wrapped application can be generic applications developed either by the enterprise or third-party vendors, such as email programs, web browsers, and document viewers that have been developed for general use. As previously discussed, in order to create wrapped applications, an enterprise or a developer of an enterprise application can utilize a wrapping utility program or tool to wrap generic applications with a policy-enforcement mechanism, which, in one embodiment, involves injecting references to dynamically linked libraries (e.g., interposition library 203) as described in more detail below in conjunction with FIG. 2, into the application's binary code that replace conventional system calls. These dynamically linked libraries replace certain system calls used by the enterprise application, forcing the enterprise application to comply with enterprise policies. For example, for communication purposes, the wrapper can replace a conventional system call to generate a TCP/IP socket with a customized call that generates and returns a socket for a VPN tunnel. This way, all data communications initiated by the enterprise application go through the VPN tunnel. Furthermore, the wrapper of the enterprise application may also communicate with the application management agent 106 to obtain the most up-to-date version of the enterprise's policies. In certain embodiments, such policies may have an expiration, thereby causing an enterprise application to periodically update its own copy of the enterprise policy when its own copy has expired.

Figure 2:
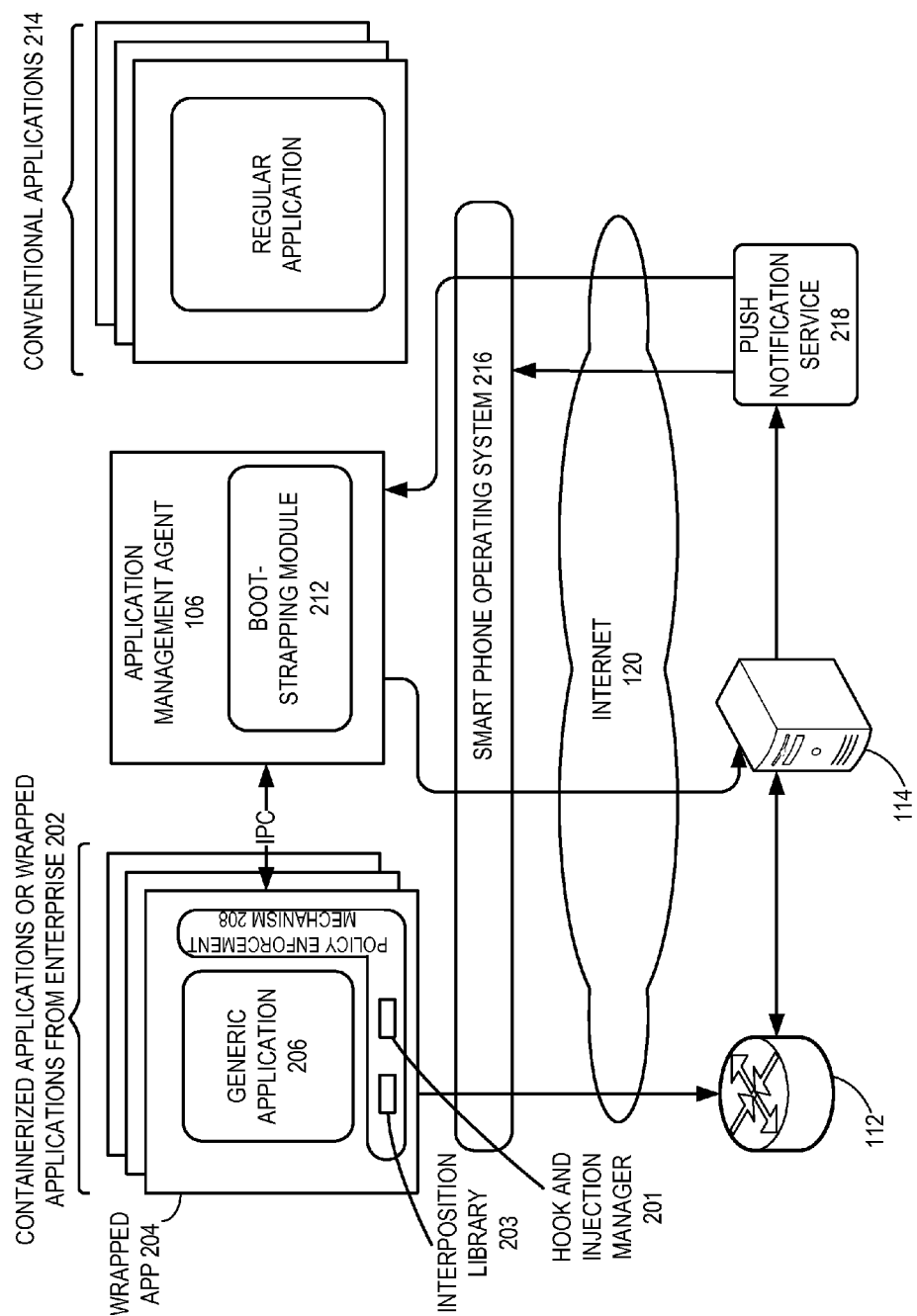
FIG. 2 illustrates an exemplary architecture of a mobile phone that facilitates isolated workspace, in accordance with an embodiment.

FIG. 2 illustrates an exemplary architecture of mobile device 100 that facilitates isolated workspace 104, in accordance with an embodiment. In the embodiment of FIG. 2, the operating system 216 of mobile device 100 supports a set of conventional applications 214 and a set of enterprise applications 202. A wrapped application 204 includes a generic application 206 wrapped with a policy enforcement mechanism 208 (which in one embodiment manifests as a wrapper, as previously discussed, comprising a set of injected dynamic libraries (e.g., an interposition library 203 dynamically loaded by a hook and injection manager 201) that replace conventional system calls of generic application 206. Policy enforcement mechanism 208 communicates enterprise policies to wrapped application 204 using, for example, an inter-process communication (IPC) mechanism to obtain such policies from application management agent 106. The interposed system library calls may, for example, communicate with application management agent 106 in order to obtain a security policy governing a user's ability to access the enterprise applications. In a mobile operating system that does not support or provides limited support for concurrently running processes such that traditional IPC is available, the mechanism for wrapped application 204 to communicate with application management agent 106 (as well as other wrapped enterprise applications) may be implemented as a secure and encrypted pasteboard (e.g., utilizing a pasteboard functionality provided by the underlying mobile operating system, such as UIPasteboard in Apple's iOS) that serves as a message-drop-box for two or more communicating applications in workspace 104.

During operation, wrapped enterprise application 204 can communicate with the enterprise network via VPN tunnel 110 terminated at gateway router 112. In one embodiment, policy enforcement mechanism 208 ensures that the network communication for generic application 206 goes through a socket corresponding to VPN tunnel 110. As a result, for example, an web browser application within workspace 104 can browse the enterprise intranet content via the VPN tunnel, and an document viewer within workspace 104 can allow the user to view documents stored on the enterprise's intranet servers. Furthermore, application management agent 106 can communicate with application management server 114, for example, residing at the enterprise, to synchronize its local copy of the enterprise's policies with the most up-to-date version of the enterprise policies. In one embodiment, application management server 114 may push application or policy related update information to application management agent 106 via a push notification service 218, such as, for example, the Apple Push Notification Service (APNS).

Embodiments of application management agent 106 include bootstrapping functionality 212, which performs a series of operations upon an initial installation and launch of application management agent 106 (e.g., which, in certain embodiments, may be downloaded by the user of the mobile device from a public application store such as the Apple App Store) in order to enable enterprise applications to operating within workspace 104. Such operations performed by bootstrapping module 212 can, for example, include authenticating the user to enterprise's remote application management server 114 (e.g., by request the user's corporate based user-name and password, etc.), requesting the user to create authentication credentials (e.g., password, PIN, etc.) to access workspace 104, generating cryptographic elements (e.g., keys, randomized names, etc.) that can be used and shared with enterprise applications to authenticate enterprise applications to application management agent 106 and secure communications among the enterprise applications and application agent 106 (e.g., by encrypting communications to a pasteboard, etc.), and obtaining an initial version of the enterprise's policies from application management server 114.

Figure 3:
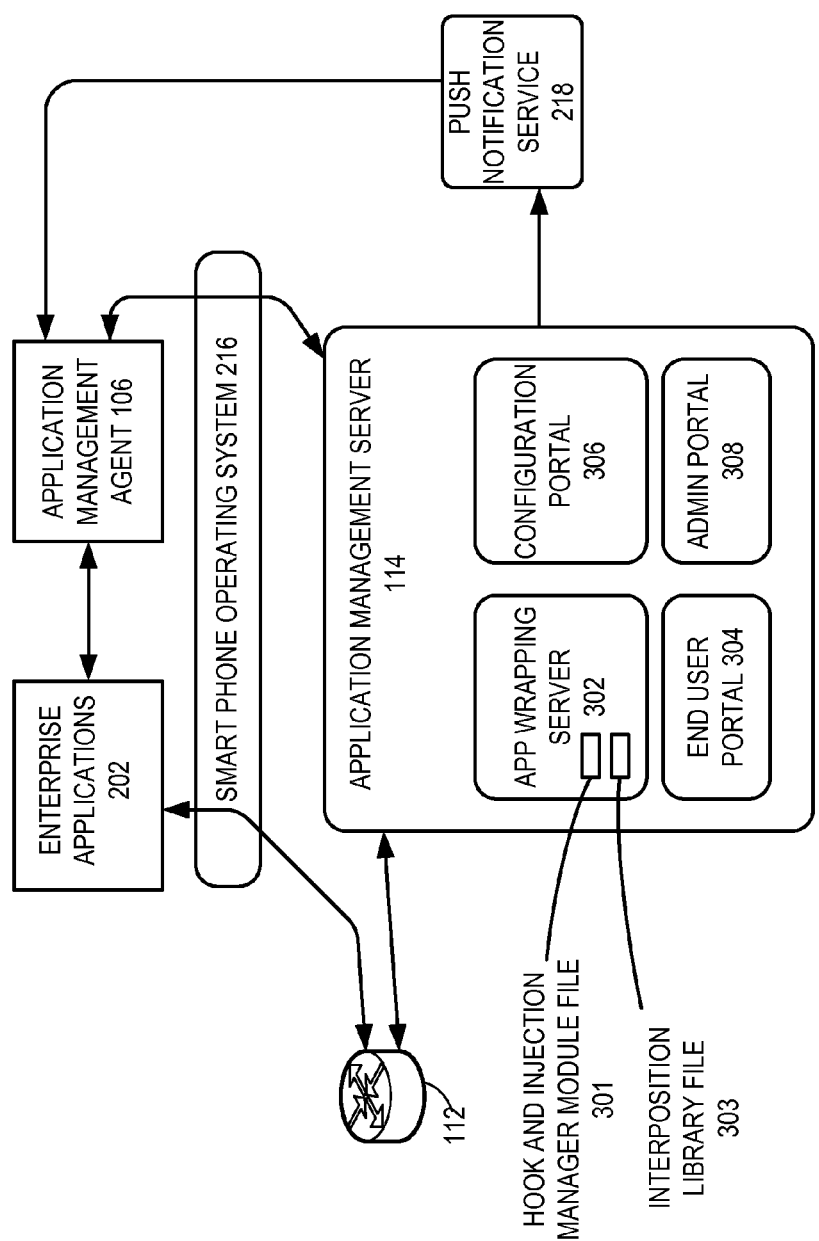
FIG. 3 illustrates an exemplary application management server that facilitates isolated workspace, in accordance with an embodiment.

FIG. 3 illustrates an exemplary application management server that facilitates isolated workspace 104, in accordance with an embodiment. In the embodiment of FIG. 3, application management server 114 includes an application wrapping server 302, an end user portal 304, a configuration portal 306, and an administrator portal 308.

Application wrapping server 302 allows the enterprise IT department to wrap any third-party application and turn the third-party application into an enterprise-specific application, which in turn can be listed in application catalogue 210 for the user to install. Details regarding modifying an application during the process of wrapping a third-party application are discussed with reference to FIG. 5, which includes adding a hook and injection manager module file 301 and an interposition library file 303 to an application archive (e.g., an .ipa file) during the wrapping process. The interposition library file 303 may include code that forms part of the policy enforcement mechanism 208. End user portal 304 allows an end user to log into application management server 114 using any network connection and manage the enterprise applications without using his smart phone. Configuration portal 305 allows an enterprise IT personnel to configure a particular user's enterprise applications, such as setting access control levels and customizing user policies. Administrator portal 308 provides an interface that allows a system administrator to configure application management server 114.

During operation, application management server 114 can communicate with enterprise applications 202 via VPN gateway router 112. Optionally, application management agent 106 may communicate with application management server 114 via a regular data connection (i.e., not via the VPN tunnel). Application management agent 106 can also use this data connection to set up the initial VPN tunnel. Application management server 114 can also provide various notifications to push notification service 218, which in turn pushes these notifications to application management agent 106.

Application Wrapping

On the application wrapping server 302, the wrapping utility tool wraps generic applications to facilitate implementation of a policy-enforcement mechanism. In one embodiment, the wrapping involves injecting references to hook and injection manager 201 and an interposition library 203 into the application's binary code that, during runtime, replaces conventional system calls. The wrapping utility tool initially receives an application binary stored in an application archive file (e.g., .ipa file). The wrapping utility tool decompresses the application archive file to extract the application binary (e.g. a Mach-O object file). (The application archive file may also include other resource files, such as an application image file and application metadata file). The wrapping utility tool may modify the application binary, and add the hook and injection manager module file and an interposition library file to the application archive. Note that the interposition library 203 can be a dynamic link library (a binary file). In some implementations, the interposition library 203 is dynamically loaded at run time by the hook and injection manager module, and does not depend on any other library. The wrapping utility tool then compresses the archive and may also sign the archive. After modification, an administrator can deploy the application throughout the enterprise. When a client device receives the application, the client device unzips and installs the application file, and then executes the application.

Figure 4A:
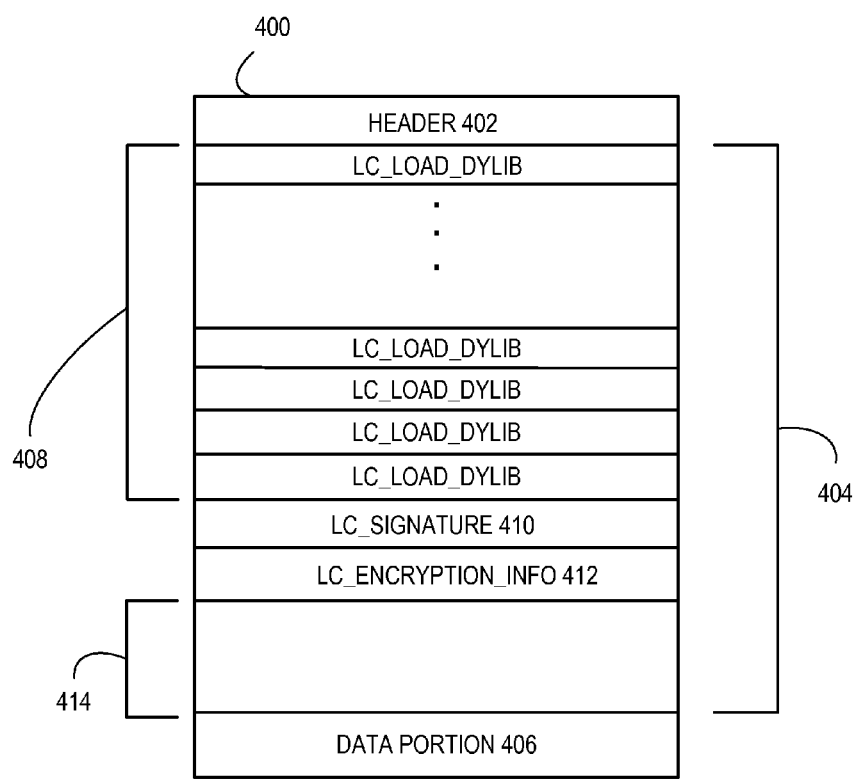
FIG. 4A illustrates an exemplary application object file, according to an embodiment.
Figure 4B:
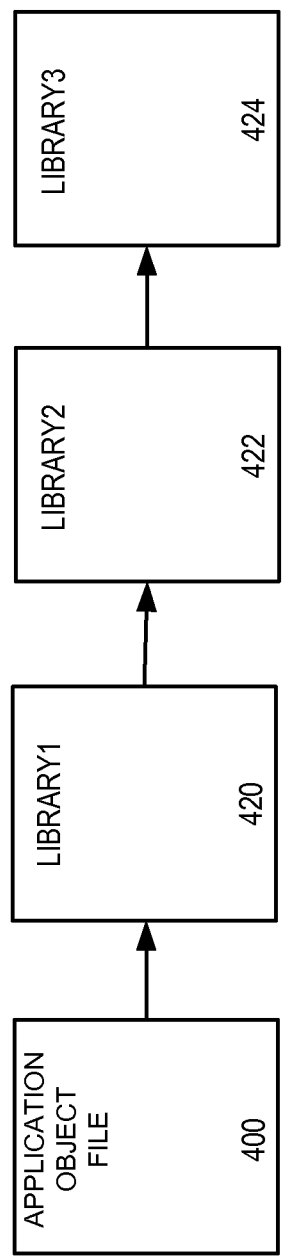
FIG. 4B illustrates a chain of module dependencies, in accordance with an embodiment.
Figure 5:
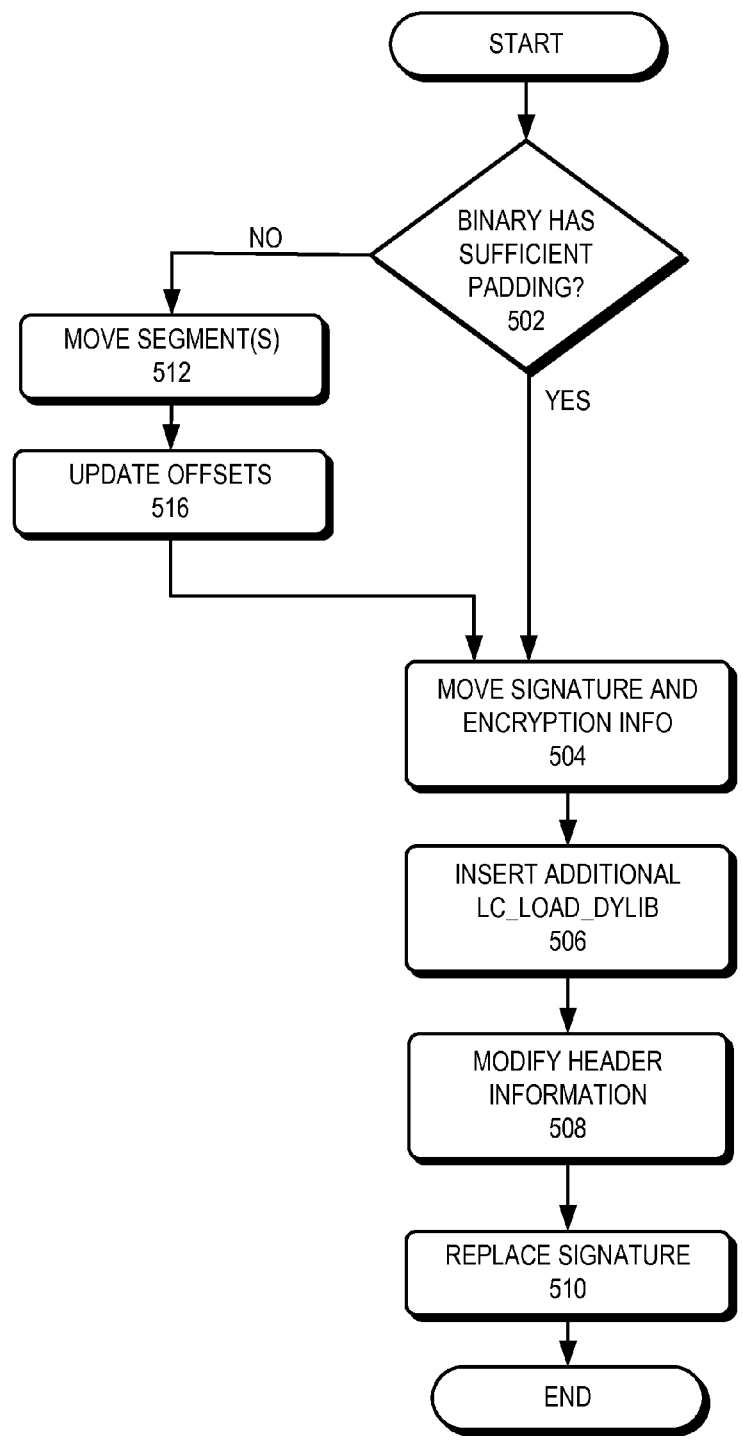
FIG. 5 illustrates a process for adding a hook and injection manager module to an application object file as a dependency, according to an embodiment.
Figure 6A:
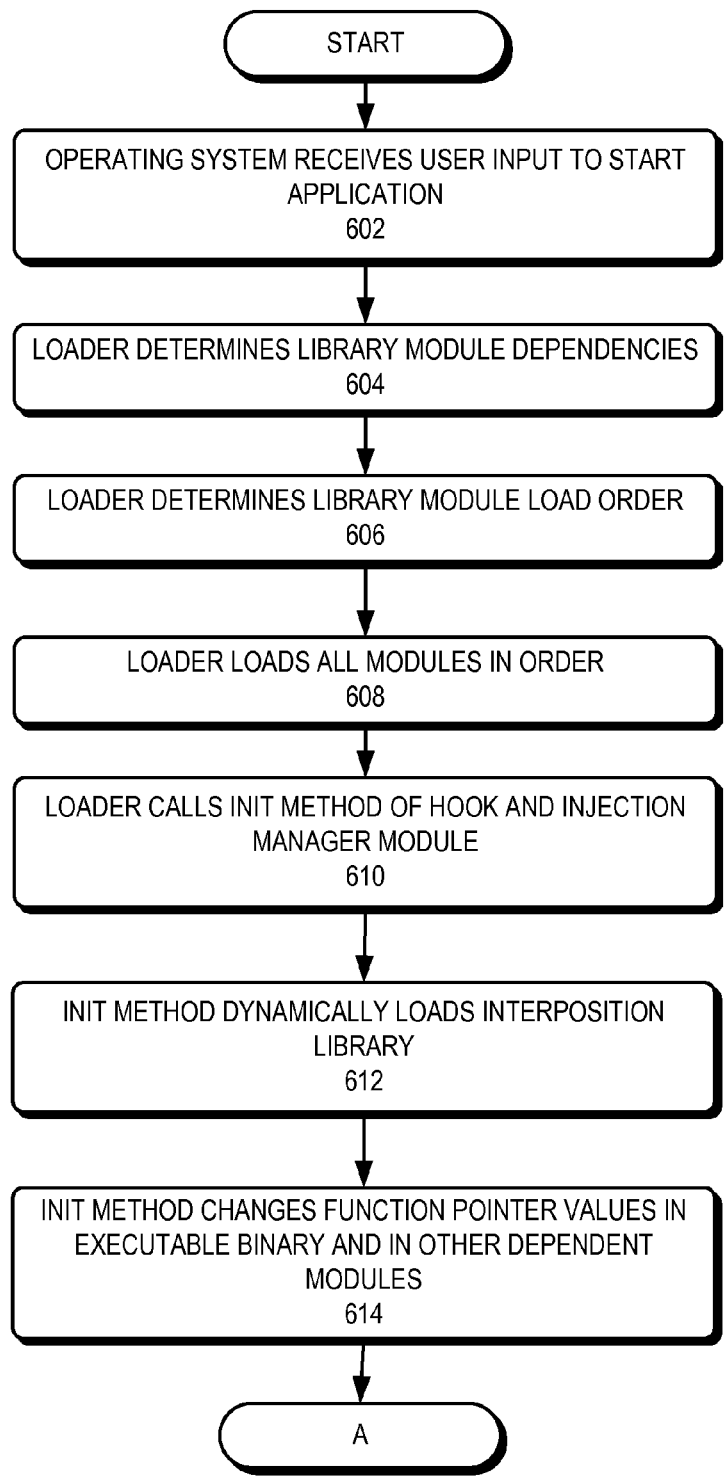
FIG. 6A and FIG. 6B together present a flowchart illustrating the process of launching an application with a hook and injection manager module, in accordance with an embodiment.
Figure 6B:
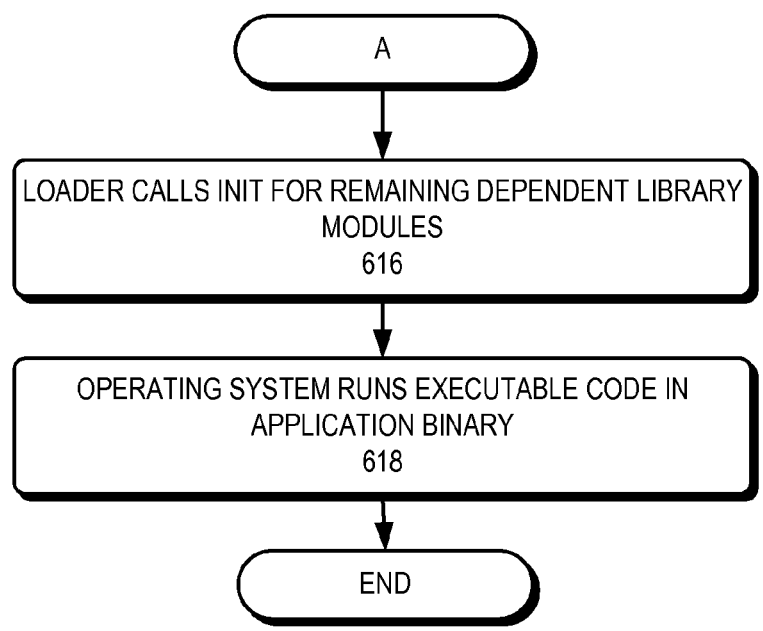
Figure 7A:
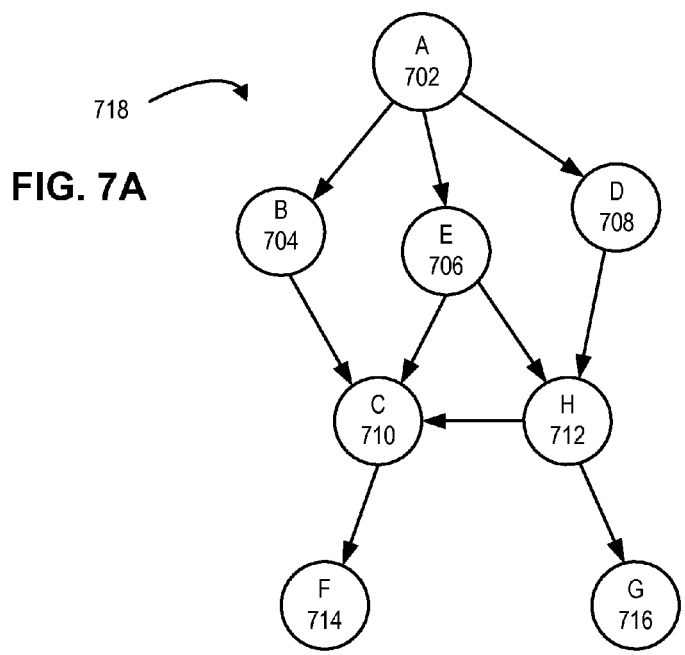
FIG. 7A and FIG. 7B illustrate an exemplary load order for module dependencies, in accordance with an embodiment.
Figure 7B:
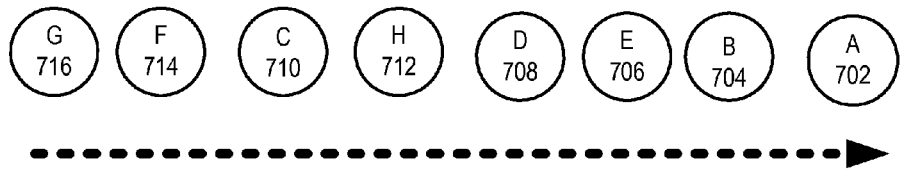
Figure 8:
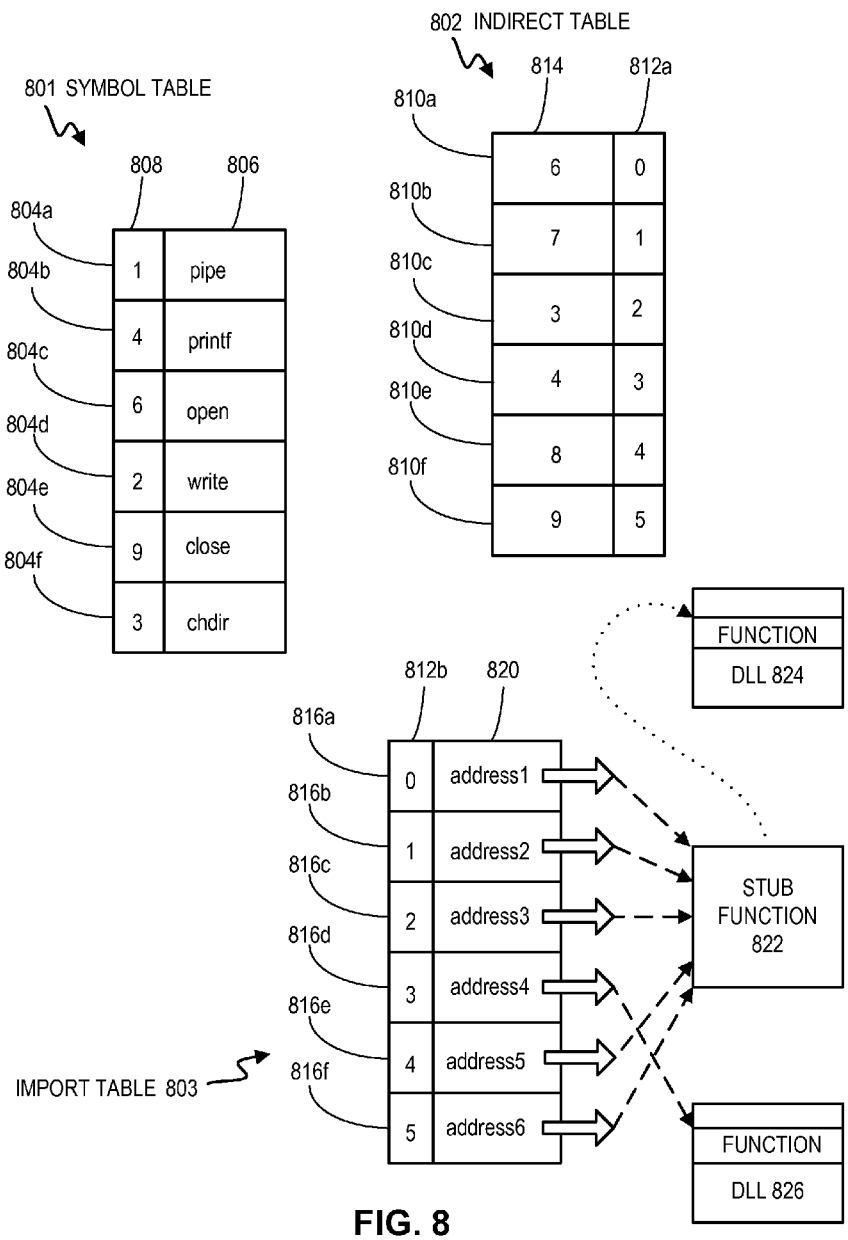
FIG. 8 illustrates an exemplary symbol table, indirect table, and import table, in accordance with an embodiment.

In the drawings and description below, FIG. 4A and FIG. 4B illustrate the structure and module dependencies of an application binary. FIG. 5 illustrates a process for modifying the application binary to cause the operating system loader to load a hook and injection manager module before loading any other module that makes system calls (e.g., modules with dependencies). FIG. 6A and FIG. 6B illustrate a process for launching the modified application binary in which the hook and injection manager completely changes function pointers for all involved system library calls (e.g., in both the application binary and in dependent modules), before any such calls are made during execution. FIG. 7A and FIG. 7B illustrate an example of determining a load order for dependencies and how the hook and injection manager 201 is loaded before any other modules. FIGS. 8 and beyond explain how, once loaded, the hook and injection manager 201 changes all function pointers for selected system library calls.

FIG. 4A illustrates an exemplary application object file. In FIG. 4A, an application object file 400, which can be a Mach-O file, includes a header 402, a load command section 404, and a data portion 406. Object file 400 is one example of generic application 206. Header 402 identifies the file type (e.g., Mach-O file) and target architecture, describes the load commands (e.g., number of load commands and number of bytes occupied by the load commands), and has flags affecting the interpretation of the file. Load commands may specify, among other things, the logical structure of the file, the layout of the file in virtual memory, locations of components such as segment and symbol tables, initial execution state of the program's main thread, and/or names of shared libraries that contain definitions for imported symbols (e.g., module dependencies).

Load command section 404 includes a list of load commands. There are different types of load commands. FIG. 4A illustrates three different load command types: LC_LOAD_DYLIB, LC_SIGNATURE, and LC_ENCRYPTION_INFO. LC_LOAD_DYLIB load commands 408 describe module dependencies of the application binary. Each module dependency has a LC_ROUTINES load command which is formatted according to a structure, and one of the fields of this structure points to an INIT function. The INIT function is an initialization function that the operating system loader calls after mapping a module or application binary to memory.

Load command section 404 also includes a security signature LC_SIGNATURE 410, and encryption information LC_ENCRYPTION_INFO 412 for a possibly encrypted _TEXT segment in Mach-o object file 400. Mach-o object file 400 contains segments and sections that form part of the segments (e.g., a _TEXT segment stores the executable code and constant data, and a _DATA segment stores data). Additional detail regarding data section 406 is discussed with reference to FIG. 9A. There may also be filler data, also called padding 414, that is unused space within the binary.

FIG. 4B illustrates a chain of module dependencies, in accordance with an embodiment. In FIG. 4B, application object file 400 references a library1 module 420 (e.g., LIB.C). Library1 module 420 references a library2 module 422 (e.g., LIBRARY.DYLIB), and library2 module 422 references a library3 module 424.

Application object file 400 may rely on one or more libraries to provide certain system functions (e.g., open a file). The system calls in such libraries may also, in turn, make system calls to other libraries. The OS loader maps these library modules into virtual memory, according to an order determined by the loader. The hook and injection manager 201 changes the function pointer values, in all the dependent library modules, to the address of a customized system call, for each interposed system function call.

The hooking and injection process adds an additional hooking and injection module to the Mach-O application binary. To inject the module into the application binary, the wrapping utility tool inserts a load command for the hook and injection manager into the Mach-O file. The hook and injection manager does not depend on any system library. At runtime, the OS loader loads all the dependency modules in the order of dependency. The operating system loader calls the INIT of the hook and injection manager to apply hooking to all the loaded code, which is automatically in the order of dependency.

FIG. 5 illustrates a process for adding a hook and injection manager module to an application binary as a dependency, according to an embodiment. The modifications to the application binary are part of the offline wrapping process, and the process steps depend on whether there is padding within the application binary. Padding is extra characters within the binary that can be removed to accommodate additional load commands or other new data. The padding may be a series of zero characters or other filler. The wrapping utility tool can remove padding to add an additional LC_LOAD_DYLIB load command that defines the name of a dynamic shared library that the application binary links against. At runtime, the dynamic linker uses the LC_LOAD_DYLIB command to locate the shared library, such as the hook and injection manager 201 which does not depend on any other shared libraries. If there is no padding or insufficient padding, the wrapping utility tool can also move existing data to make space for the additional LC_LOAD_DYLIB load command.

The wrapping utility tool initially determines whether there is sufficient padding in the application binary (operation 502). If the binary contains sufficient padding (e.g., padding 414), the wrapping utility tool can remove the padding to add an additional LC_LOAD_DYLIB load command associated with the hook and injection manager 201. The wrapping utility tool moves LC_SIGNATURE 410 and LC_ENCRYPTION_INFO 412 towards data portion 406 to make space for another LC_LOAD_DYLIB load command entry, thereby reducing the amount of padding (operation 504). The wrapping utility then inserts an additional LC_LOAD_DYLIB entry into the space previously occupied by LC_SIGNATURE 310 (operation 506). Since the padding 414 can be removed, the relative position of the data portion 406 stays the same. The wrapping utility tool also modifies header information 402 to include description for the added LC_LOAD_DYLIB load command (operation 508). Subsequently, the wrapping utility tool computes a new signature for the binary and overwrites LC_SIGNATURE 410 with the new signature (operation 510). LC_ENCRYPTION_INFO 412 remains the same since the encryption information is for _TEXT segment in the data portion 406, which does not change.

If there is no sufficient padding (e.g., padding 414 is non-existent) within the application binary, the wrapping utility tool expands the binary file to accommodate a new LC_LOAD_DYLIB entry by moving the _TEXT segment (and other segments) in data portion 406 away from header 402 (operation 512). The wrapping utility tool then updates offsets in the _TEXT segment and/or other segments of data portion 406 (operation 516). Such offsets are from the beginning of the binary file, and hence the update is necessary since the _TEXT segment in data portion 406 has changed location in the application binary. The wrapping utility tool also moves LC_SIGNATURE 410 and LC_ENCRYPTION_INFO 412 away from header 402 (operation 504). The wrapping utility tool then inserts a new LC_LOAD_DYLIB entry for the hook and injection manager module at the former location of LC_SIGNATURE 410 (operation 506). The wrapping utility tool further modifies the header information to include data for the additional load command (operation 508), and creates a new signature for the entire application binary and replaces the signature at the new location of LC_SIGNATURE 410 (operation 510).

The offline modification to the application binary causes the hook and injection manager module to be loaded into the application's process immediately at the launch of the application. The operating system loader determines a loading order for the modules, and loads modules with no dependencies of their own before any modules with dependencies are loaded. The wrapping procedures add a hook and injection manager module that loads before any other modules with dependencies are loaded. When the application is launched, the hook and injection manager 201 will make changes to the application binary and dependent modules after launch but before execution of the application. Those changes replace the library system calls.

FIG. 6A and FIG. 6B together present a flowchart illustrating the process of launching an application with a hook and injection manager module. As illustrated in FIG. 6A, initially, the operating system receives user input to start the application (operation 602). For example, a user may start the application by selecting an application icon on a touch screen. Next, the operating system loader determines the library module dependencies for the application binary (operation 604), and the module load order based on their dependency (operation 606). The process of determining the module load order is discussed in further detail with reference to FIGS. 7A-7B. The loader then loads into memory all the modules in the determined order (operation 608). As discussed previously, the loader loads the hook and injection manager module prior to loading any other modules with dependencies.

After loading all the modules into memory, the loader calls an INIT method of the hook and injection manager module (operation 610). The INIT method may dynamically load an interposition library (operation 612). Note that, in one embodiment, the interposition library 203 is self-sufficient and does not depend on any other library. Then, the INIT method changes function pointer values in the application's executable binary and in the other dependent modules (operation 614).

In one example, the wrapping utility tool may replace an open system call with a customized system call hook_open. If the open system call also depends on a code module (e.g., an input/output module), that code module would have a LC_LOAD_DYLIB entry in the module storing open. The INIT function of the interposition library 203 replaces, in all the modules and the application binary, the function pointer values associated with the open system call. Changing the function pointer values is further discussed with reference to FIGS. 8-12. The changes to the function pointer values replace calls to conventional system libraries with calls to customized libraries.

The loader then calls the INIT method for the remaining dependent library modules. The INIT methods may be called in the same order as the order of loading the various modules (operation 616). After the function calls have been properly interposed or replaced, the operating system then runs the executable code for the program in the application binary (operation 618).

FIG. 7A and FIG. 7B illustrate an exemplary load order for module dependencies, in accordance with an embodiment. An application has module dependencies, and each dependency module may also have other dependencies. The loader first loads basic system libraries which have no dependencies. In order to determine a loading order, the loader performs a topological sort of the application binary and dependent modules. By ensuring that the hook and injection manager module has no dependencies, the wrapping utility tool can cause the operating system to load the hook and injection manager module before loading any other modules that make library calls. The hook and injection manager can then make the changes to the application binary or libraries to interpose or replace library calls, before the actual execution of any code within the application or modules.

In FIG. 7A, an application A 702 has dependencies module B 704, module E 706, and module D 708. Module E 706 has dependencies module C 710 and module H 712. Module C 710 has one dependency module F 714. Module H 712 has two dependencies module G 716 and module C 710. The loader can perform a topological sort of the nodes in FIG. 7A to determine a loading order. A topological sort of a directed acyclic graph is a linear ordering of the graph's nodes such that, for every edge uv, node u comes before node v in the ordering. The result may not be a unique ordering, since there may be multiple such orderings.

FIG. 7B illustrates an exemplary loading order for the modules. Module G contains the executable code for interposing system calls. The loader determines that module G 716 has no dependencies, and therefore module G 716 should be loaded first. Application A 702 is loaded last. Note that since module F does not make any library calls, the loader can also load module F before loading module G.

Figure 9A:
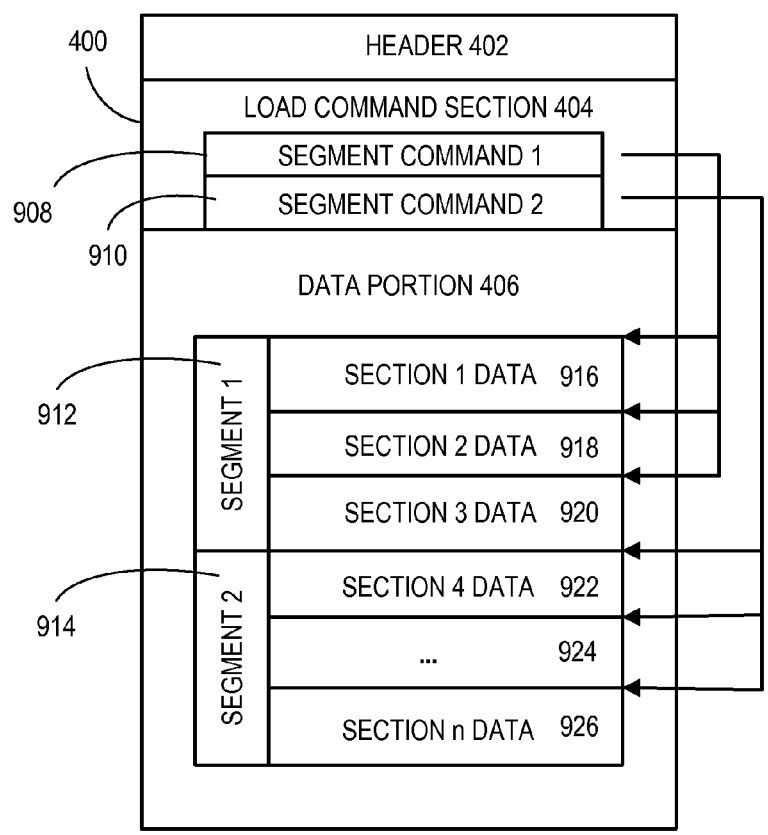
FIG. 9A illustrates the exemplary file format structure of FIG. 4A with segments and sections, in accordance with an embodiment.
Figure 10:
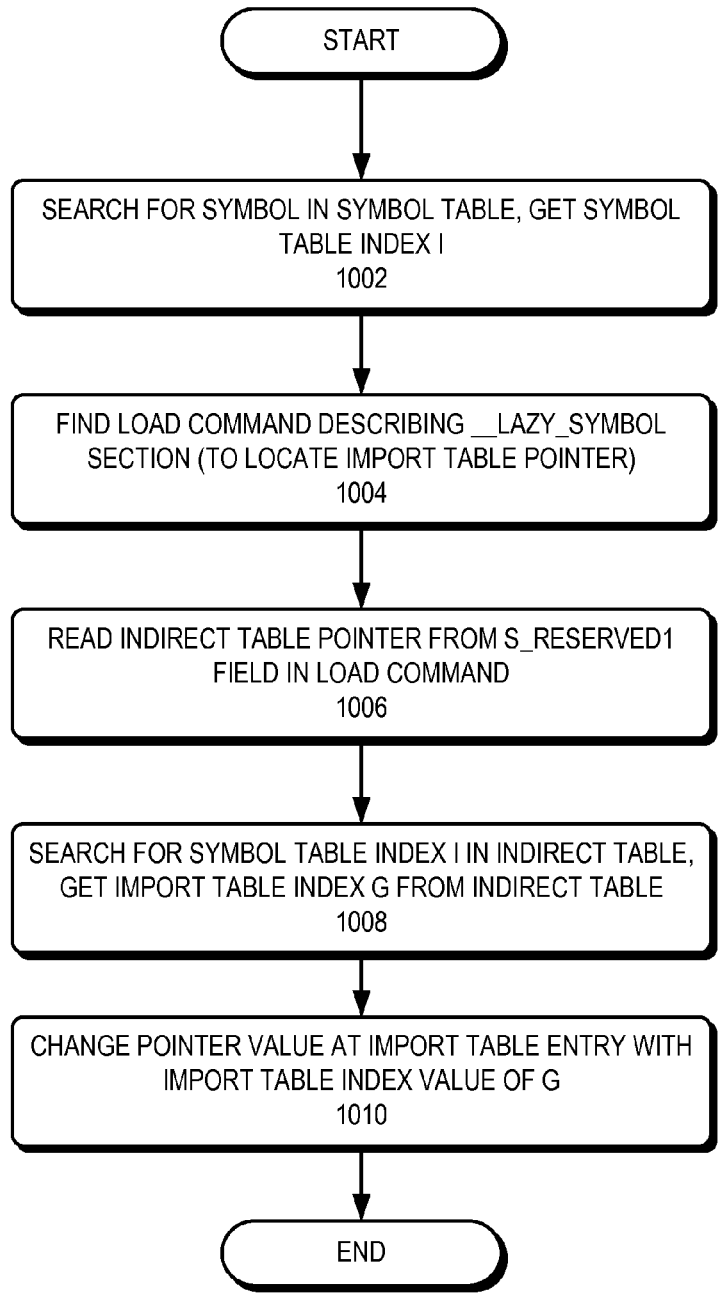
FIG. 10 presents a flowchart illustrating an exemplary process for replacing function pointer values in an import table, in accordance with an embodiment.
Figure 11:
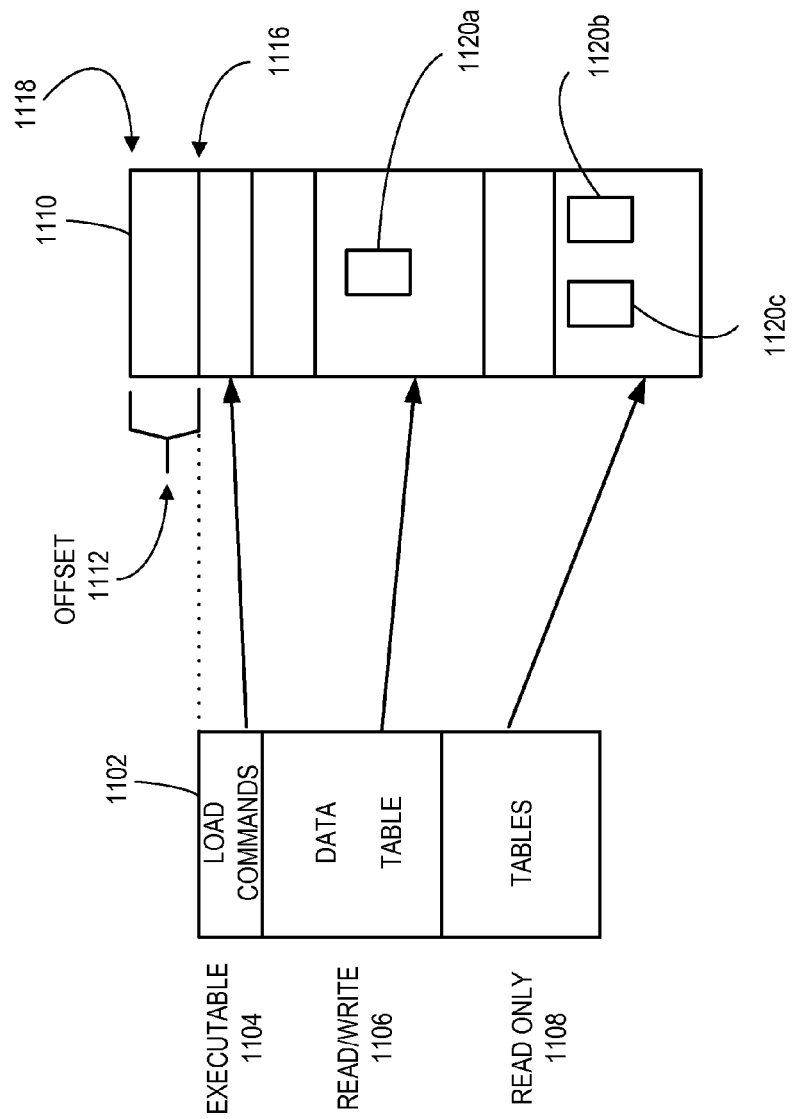
FIG. 11 illustrates an exemplary mapping of a shared library cache to segmented virtual memory, in accordance with an embodiment.
Figure 12:
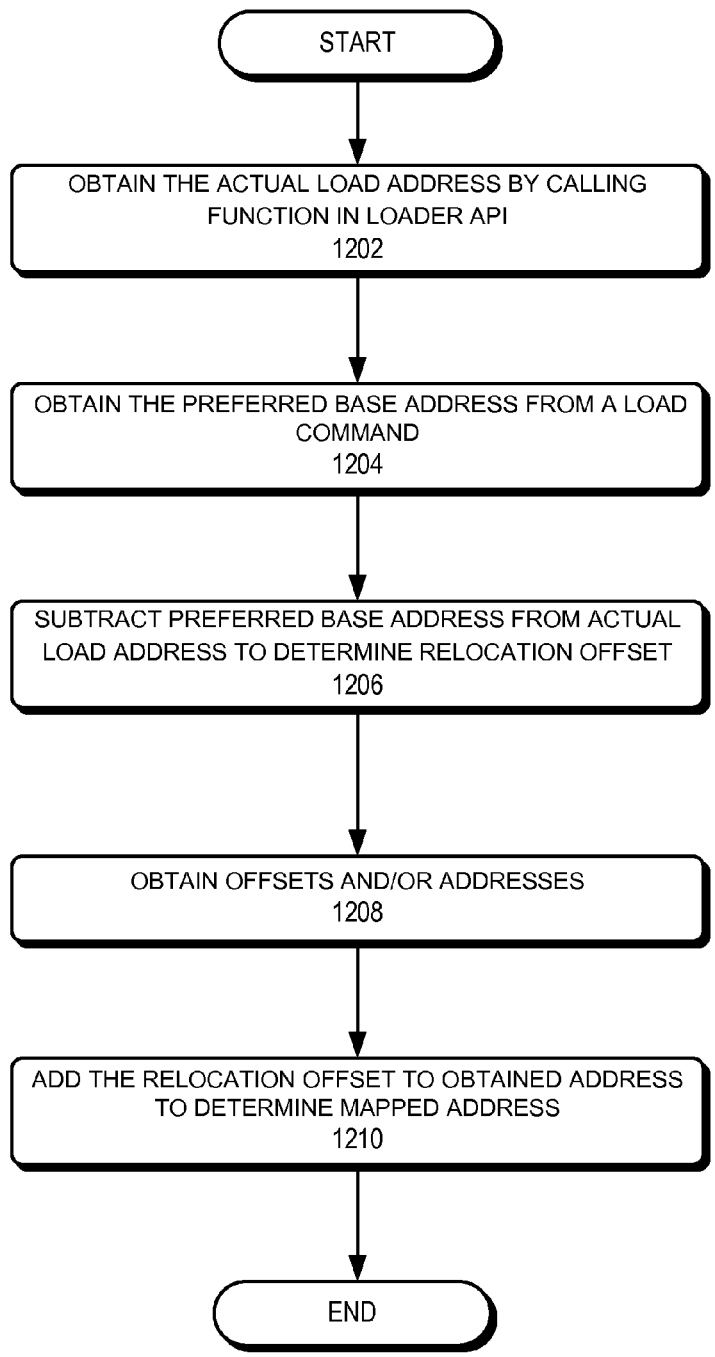
FIG. 12 illustrates steps to replace function pointer values in libraries mapped from a shared cache, according to an embodiment.

In the drawings and description below, FIG. 8 illustrates and describes the various tables that the hook and injection manager 201 references and/or modifies in order to change function pointer values for a system library call. FIG. 9A illustrates and describes the relevant portions of an application binary used to access to the various tables. FIG. 10 illustrates and describes a process for changing the function pointer values in an import table for a system library call. FIG. 11 illustrates and describes how libraries are mapped from a cache to segmented virtual memory, and FIG. 12 illustrates and describes how to locate tables in segmented virtual memory. By completely changing all function pointers for a system library call in both the application binary and the library modules, the hook and injection manager 201 can successfully interpose the system library call.

FIG. 8 illustrates an exemplary symbol table 801, indirect table 802, and import table 803, in accordance with an embodiment. A symbol table contains, in each table entry row, a mapping of a symbol (e.g., function name) to index information that can be used to determine which entry of an import table contains a function pointer for the function. A function pointer points to the location of the function's executable code within memory. Each symbol table entry is a data structure of type nlist. Note that symbol table 801 is a global symbol table.

An import table contains, in each table entry, a mapping from an index associated with a function symbol to an address (or function pointer) for the function associated with the symbol. Each function pointer holds an address at which the code for the function may be found. Note that each application binary stores different content within the import table associated with that application. An import table contains the addresses for functions that are not defined in the application binary, but rather are imported from a different file. The import table may be a lazy symbol table or a non-lazy symbol table. The loader does not determine the address of a function with a function pointer listed in a lazy symbol table until the first time that the function is called (e.g., first invocation of the function). The loader determines the address of a function with a function pointer listed in the non-lazy symbol table at the time the module or executable is loaded or mapped into memory.

An indirect table connects the information in the symbol table and the import table by providing a mapping between the indices in the two tables.

In FIG. 8, symbol table 801 includes a list of symbol entries 804*a*-804*f*. Each of symbol entries 804*a*-804*f* includes a symbol in a symbol column 806 and a symbol index value in a symbol index column 808. Note that the symbol table 801 may be a global symbol table, and includes all symbols referenced in a file plus symbols from imported modules.

Indirect table 802 includes a list of indirection entries 810*a*-810*f*. Each of indirection entries 810*a*-810*f* includes an import index value in an import index column 812*a*, and a symbol index value in a symbol reference column 814. Note that the symbol index values in the symbol reference column 814 (in indirect table 802) may be cross-referenced against the symbol index values in the symbol index column 808 (in symbol table 801).

Import table 803 contains a list of function pointers for functions imported from a different file (e.g., imported from a library module). Import table 803 includes a list of function pointer entries 816*a*-816*f*. Each of function pointer entries 816*a*-816*f* includes an import index value stored in an import index column 812*b*, and a function pointer (e.g., address) column 820. Each of function pointer entries 816*a*-816*f* stores a mapping between an import index value associated with a library function and an address associated with that library function. For example, entry 816*d* may store a function pointer value (e.g., an address) associated with the printf system call. The function pointer values can be offset values representing the addresses of function code. The index values of import index column 812*a* in indirect table 802 correspond to (or are same as) the index values in import index column 812*b* in import table 803.

Note that prior to changing the function pointer values, the function pointer values in all of entries 816*a*-816*f* may be the address of a stub function 822 (e.g., dyld_stub_binder). When stub function 822 receives, as input, an import index value (or offset address), stub function 822 outputs a function pointer value (e.g., address) of the function associated with the input import index value. The application can then call the function (e.g., stored in a system-loaded DLL 824) using the address received from stub function 822. Note that different systems may implement the specific details of calling a function using a stub function in different ways. Some systems may need to perform multiple mappings to determine the function address in the system-loaded DLL 824.

With the techniques described herein, the hook and injection manager 201 obviates the need to use stub function 822. Hook and injection manager 201 substitutes conventional system library calls with customized system library calls by changing the addresses stored in the import table entries to the addresses of the customized system calls. For example, hook and injection manager 201 can change the function pointer entry 816*d* to store an address for a customized function located in DLL 826, instead of the address for stub function 822. In one embodiment, the hook and injection manager 201 can determine the table entry for changing a function address in the import table by referencing the indirect table 802. The hook and injection manager 201 references the symbol reference column 814 in indirect table 802 in order to determine the proper table entry for import index column 812b in import table 803. Additional details of the process for determining the appropriate entry in import table 803 for replacing a function pointer value is discussed with reference to FIG. 10.

Embodiments of the present invention also change pointer values in non-lazy symbol tables. In some instances, functions are called by function pointer instead of function name. For example, if the address of an open system call is held in a function pointer, the application code can call open using the function pointer (instead of using the open symbol). The lazy symbol table contains only the system library calls that are called by function symbol (e.g., open or printf). In contrast, a function symbol is present in a non-lazy symbol pointer table if the function is called using a function pointer.

By changing pointer values in non-lazy symbol tables, a system call made through a function pointer can be redirected to the customized system call. Hook and injection manager 201 can access the non-lazy pointer table by looking up a load command associated with the non-lazy pointer table. Note that the non-lazy pointer table is present in both the application binary and the library modules.

Thus, all possible scenarios for making a system library call are covered: 1) a call can be made from within an application binary or from within a library module and 2) a system library call can be made by symbol or by function pointer. The techniques disclosed herein covers the different ways a system library call can be made within a system process and facilitates implementation of the policy enforcement mechanism 208.

Note that implementations of the tables as illustrated in this specification may contain more or less than the number of entries or columns depicted. Embodiments of the present invention are not limited to any particular number of entries or columns in the tables.

FIG. 9A illustrates the exemplary file format structure of FIG. 4A with segments and sections, in accordance with an embodiment. The file format structure (e.g., Mach-O file format structure) of FIG. 4A includes segments and sections that are illustrated in FIG. 9A. A segment defines a range of bytes in a file and the addresses and memory protection attributes at which those bytes are mapped into virtual memory. Each segment includes zero or more sections. Each section of a segment contains a particular type of code or data.

In FIG. 9A, the (e.g., Mach-O) application object file 400 file format structure includes a header 402, load command section 404, and a data portion 406. Load command section 404 includes one or more load commands 908, 910 (shown as segment commands 1, 2 in FIG. 9A). Note that load commands 908, 910 may be any type or number of load commands, including the load commands discussed with reference to FIG. 4A. Load commands for segments may include fields such as vmaddr, which indicates the starting virtual memory address of a segment, or fileoff, which indicates the offset in the file of the data to be mapped at vmaddr, or vmsize, which indicates the number of bytes of virtual memory occupied by the segment. A segment load command may also include nsects, which indicates the number of section data structures that follow the load command. Data portion 406 includes one or more segments 912, 914. Segment 912 (shown as segment 1 in the figure) includes sections 916, 918, 920, and segment 914 (shown as segment 2 in the figure) includes sections 922, 924, 926.

The hook and injection manager 201 searches through the load commands to find a pointer holding an address of the indirect table and the pointer holding an address of an import table. Load commands may describe the name and type of segments and sections, and each segment is described by a load command. In the segment load commands (e.g., LC_SEGMENT type of load commands), following a segment_command data structure is an array of section data structures that describe sections. The section data structures include a S_RESERVED1 field. In a section with symbol pointer type (e.g., S_LAZYSYMBOL type), the S_RESERVED1 field is a pointer holding the address of the indirect table (e.g., pointing to indirect table 802 in FIG. 8). The hook and injection manager 201 can linearly search through all the segment load commands to find the load command for a _lazy_symbol section in the _DATA segment. The _lazy_symbol section structure has a S_RESERVED1 field holding the address for the indirect table. Within the same _lazy_symbol section structure, the hook and injection manager 201 can also find a pointer to the import table.

Note that the hook and injection manager 201 can also find a pointer to the non-lazy symbol table in an analogous manner. Hook and injection manager 201 can search for a _non_lazy_symbol section structure in the _DATA segment data structure, and obtain a pointer to the non-lazy symbol table and pointer to a corresponding indirect table.

The hook and injection manager 201 can locate and examine a load command (e.g., LC_SYMTAB type) to determine the size and location of the symbol table. After determining the memory locations of indirect table 802, symbol table 801, and import table 803, the hook and injection manager 201 can replace one or more addresses held in the function pointers of the import table and non-lazy symbol table. FIG. 10 illustrates and describes a function interpose process that uses these techniques to locate the various tables.

FIG. 10 presents a flowchart illustrating an exemplary process for replacing function pointer values in an import table, in accordance with an embodiment. The process described with reference to FIG. 10 may be performed by the hook and injection manager 201. Upon launch of a modified application, the loader loads the hook and injection manager module, the hook and injection manager 201 dynamically loads the interposition library 203, and the hook and injection manager 201 may interpose on one or more functions by calling an interposition function The process described in FIG. 10 can be implemented as an interposition function in the interposition library 203. Such an interposition function may accept, as input, a function name (e.g., symbol representing the function) and an address for customized function code (e.g., hook_api ("printf", hook_printf)). The interposition function performs a series of steps to determine which function pointer entry in the import table is associated with the function name. The interposition function changes the original function address held by the function pointer to the address for the customized function. Note that the description for FIG. 10 uses the lazy symbol pointer table as the import table, but analogous steps may also be performed for non-lazy symbol pointer table.

During operation, hook and injection manager 201 initially searches for a function symbol (e.g., printf function symbol) in the symbol table (operation 1002). For example, from the symbol table 801, hook and injection manager 201 obtains the symbol table index value of 4 (e.g., entry 804b) for the printf function symbol. Next, hook and injection manager 201 searches through the load commands to find a load command describing a _lazy_symbol section in a _DATA segment (operation 1004). From the load command's section structure, hook and injection manager 201 obtains a pointer to the import table. Subsequently, the hook and injection manager 201 obtains a pointer to the indirect table from the S_RESERVED1 field of the same load command's section structure (operation 1006). Note that the hook and injection manager 201 can also obtain the pointers to the indirect table and/or import table prior to searching through the symbol table for the symbol. Embodiments of the present invention are not limited to any particular ordering of the steps described in the process.

Using the pointer to the indirect table and symbol table index value (e.g. 4), the hook and injection manager 201 can search (e.g., linearly) through the indirect table in column 814. Once the hook and injection manager 201 finds the symbol table index value i (e.g. i=4) in the indirect table, the hook and injection manager 201 obtains the corresponding import table index value g (e.g., g=3) from the indirect table (operation 1008). For example, in FIG. 8, the import table index value of 3 is located at entry 810*d* of indirect table 802. The hook and injection manager 201 then searches for and changes the pointer value at the import table entry of index value g (e.g., entry 816*d*) (operation 1010). The hook and injection manager 201 replaces the current system call address pointed to by the pointer with the new address of the customized system call. For example, the hook and injection manager 201 changes the pointer value at entry 816*d* to a new address for printf. Thus, the hook and injection manager 201 is able to intercept system library calls and redirect the library calls to customized functions. This interposition mechanism allows the enterprise to control all communications of the application and facilitates implementation of policy control mechanism 208.

In the following, FIG. 11 illustrates a shared library cache, and FIG. 12 illustrates the steps for replacing function pointer values for libraries loaded from the shared cache of FIG. 11.

FIG. 11 illustrates an exemplary mapping of a shared library cache to segmented virtual memory, in accordance with an embodiment. In some operating systems (e.g., iOS), system libraries are stored in a shared cache. Unlike the loading of an application binary to contiguous memory locations, the loader maps the cached libraries into segmented virtual memory locations.

In FIG. 11, a shared library cache 1102 stores system library modules, and includes an executable portion 1104 that stores load commands, a read and write portion 1106 that stores data and a table, and a read-only portion 1108 that stores tables. The operating system loader maps system libraries from shared library cache 1102 to segmented virtual memory 1110. The executable portion is mapped to virtual memory location 1116, which is the actual load address. Virtual memory location 1116 may be different from a preferred base address; such a preferred base address is described in a load command of the executable portion 1104.

Hook and injection manager 201 can calculate a relocation offset (e.g., relocation offset=actual load address—preferred base address) to compensate for not mapping the executable portion 1104 to the preferred base address. Hook and injection manager 201 also calculates an offset 1112 that indicates the amount of memory space between the beginning of the virtual memory space 1118 and virtual memory location 1116. The actual mapped locations of import tables, executable portion, read/write portion, function pointers, etc. can then be computed using offset 1112 and the relocation offset.

The hook and injection manager 201 may traverse through the shared libraries in memory 1110 to change function pointer values. Note that traversing through the portions of segmented virtual memory 1110 storing the shared libraries is not a straightforward task, since the portions of virtual memory storing the shared libraries are not necessarily contiguous. The steps to traverse the loaded library modules to change the function pointer values in import tables 1120*a*, 1120*b*, and 1120*c* are discussed with reference to FIG. 12. Note that import tables 1120*a*, 1120*b*, and 1120*c* can be either a lazy symbol table or a non-lazy symbol table.

FIG. 12 illustrates steps to replace function pointer values in libraries mapped from a shared cache, according to an embodiment. Compared to the technique to replace function pointer values in a loaded application binary, a different technique is used to traverse segmented virtual memory locations to change function pointer values. The following steps may be performed by the INIT method of the hook and injection manager 201. Note that since any function may make a system call, including customized library functions, or functions within standard system libraries, the hook and injection manager 201 must go through all the loaded modules and change all pointer values for a conventional library function to point to a customized library function.

For shared libraries mapped from a shared cache, the hook and injection manager 201 first calculates an offset 1112 and then calculates a relocation offset, to determine the mapped locations of import tables and function pointers in segmented virtual memory. The hook and injection manager 201 initially obtains the actual load address (e.g., virtual memory location 1116) by calling a function in the loader API (operation 1202). Next, the hook and injection manager 201 obtains the preferred base address from a load command (operation 1204). Note that the preferred base address is the address of the _TEXT segment in shared library cache 1102. Hook and injection manager 201 can obtain the address of the preferred base address by reading a LC_SEGMENT load command. The hook and injection manager 201 then subtracts the preferred base address from the actual load address to determine the relocation offset (operation 1206). Note that the relocation offset may be a positive or negative value. The hook and injection manager 201 can then obtain various addresses (e.g., address of the lazy symbol pointer section or address of the non-lazy symbol pointer section) and/or offsets from shared library cache 1102 (operation 1208). Also, the hook and injection manager 201 determines offset 1112 by computing the difference between actual load address and beginning of virtual memory space 1118 (e.g., offset 1112=virtual memory location 1116−beginning of virtual memory space 1118).

Finally, the hook and injection manager 201 adds the relocation offset to an address (e.g., address of the lazy symbol pointer section or address of the non-lazy symbol pointer section) to determine the mapped virtual memory address (operation 1210). Note that if the relocation offset is a negative value, then the absolute value of the relocation offset is subtracted, rather than added, from the address. For example, if preferred base address is 100 and the actual load address is 90, then the relocation offset is −10. Then, if the address of a section read from a load command is 150, then the mapped address in the segmented virtual memory is 140. Similar computations are made for the mapped addresses of tables in the read/write section 1106 and tables in the read-only section 1108. The hook and injection manager 201 can determine the offsets of the tables in the read/write section 1106 and the read-only section 1108, add the relocation offset, and then change function pointer values in the tables.

System Architecture

Figure 13:
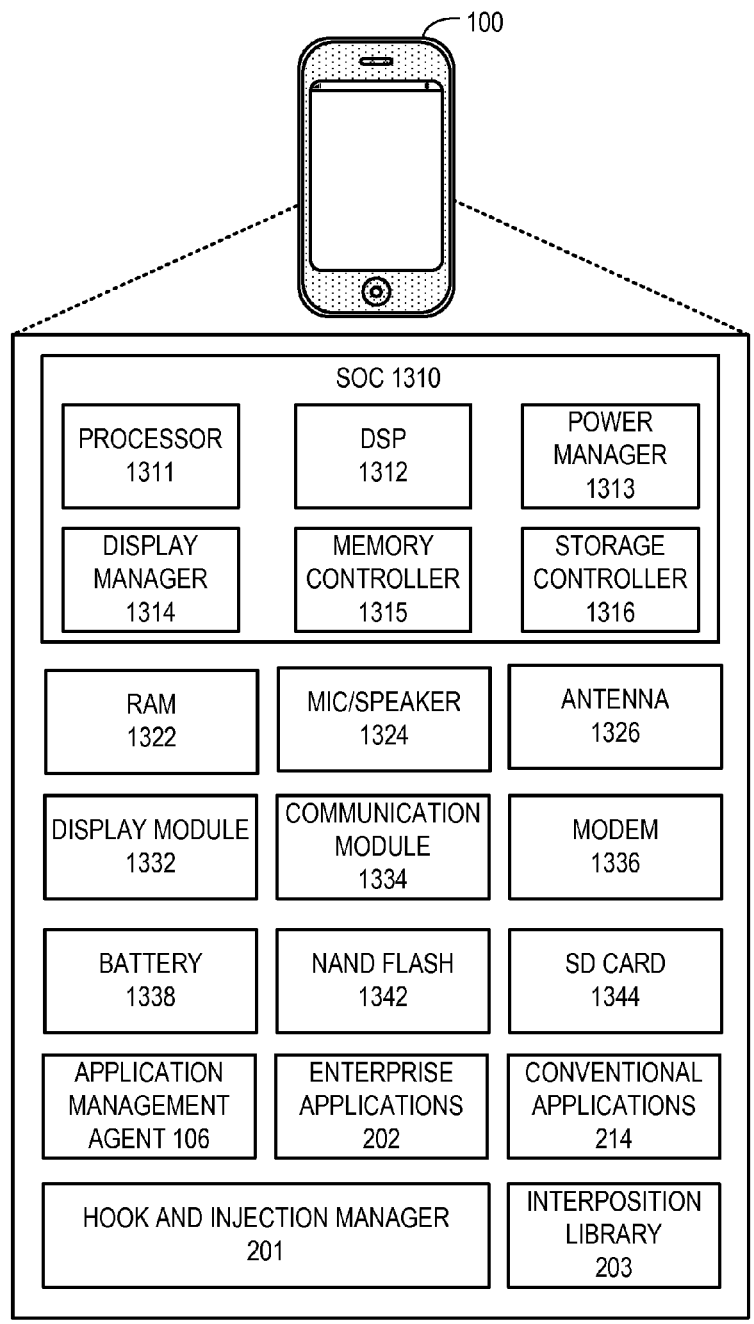
FIG. 13 illustrates an exemplary architecture of a mobile device that supports isolated workspace, in accordance with an embodiment.

FIG. 13 illustrates an exemplary architecture of a mobile device that supports isolated workspace, in accordance with an embodiment. A mobile phone 100 includes a system on a chip (SoC) 1310 that provides the basic functionality to the system. SoC 1310 includes a processor 1311 that executes the operations of system 100. Digital signal processor 1312 performs the signal processing, such as analog to digital conversion, for system 100. Power manager 1313 controls battery 1338. Display manager 1314 controls display module 1332 and provides display to a user. In some embodiment, display module includes a liquid crystal display (LCD). Memory controller 1315 allows processor 1311 to access random access memory (RAM) 1322. Storage controller 1316 provides accesses to internal and external storage of system 700.

Microphone/speaker module 1324 allows a user to perform regular voice operations. Communication module 1324 uses antenna 1326 and modem 1336 to connect to a telephone network. NAND flash 1342 is the internal storage and SD card 1344 is the external storage for system 100. Integrity module 1352 performs integrity checks on NAND flash 1342 and SD card 1344. Application management agent 106 manages enterprise applications 202 and maintains isolated workspace 104. Also included in SoC 1310 are a set of conventional applications 214. Hook and injection manager 201 and interposition library 203 form part of the wrapper that facilitates enforcement of enterprise policies.

Note that the above-mentioned modules can be implemented in hardware as well as in software. In some embodiments, one or more of these modules can be embodied in computer-executable instructions stored in a memory which is coupled to one or more processors in system 100. When executed, these instructions cause the processor(s) to perform the aforementioned functions.

In summary, embodiments of the present invention provide a system and a method for facilitating replacement of a system call in an application with a customized function call. During operation, the system adds a load command to an object file for the application, wherein the load command can cause an operating system loader to load, during run time, code that does not make any call to libraries, and wherein during run time the loaded code can change a pointer in a table which indicate addresses of imported functions so that the pointer indicates an address of the customized function call.

The methods and processes described herein can be embodied as code and/or data, which can be stored in a computer-readable non-transitory storage medium. When a computer system reads and executes the code and/or data stored on the computer-readable non-transitory storage medium, the computer system performs the methods and processes embodied as data structures and code and stored within the medium.

The foregoing descriptions of embodiments of the present invention have been presented only for purposes of illustration and description. They are not intended to be exhaustive or to limit this disclosure. Accordingly, many modifications and variations will be apparent to practitioners skilled in the art. The scope of the present invention is defined by the appended claims.

What is claimed is:

1. A method, comprising:
    modifying, prior to run time, an executable file of an application to cause an operating system loader to load additional code by injecting a dynamically-linked library having the additional code into the application;
    wherein modifying the executable file comprises:
        determining whether the executable file includes sufficient unused space to accommodate a load command;
        responsive to the executable file including sufficient unused space, shifting, in the executable file, an existing load command which does not contain dependency information to make space for the load command; and
        adding the load command to the executable file; and,
    wherein the additional code, when executed by a processor, causes the processor to change a pointer in a table that indicates an address of an imported function implementing a system call so that the pointer indicates an address of a customized function.

2. The method of claim 1, further comprising computing a new signature for the executable file and replacing an existing signature in the executable file with the new signature.

3. The method of claim 1, wherein responsive to the executable file not including sufficient unused space, moving a portion of the executable file to make space for the load command.

4. The method of claim 3, further comprising changing offsets in the moved portion of the executable file.

5. The method of claim 1,
    wherein the executable file imports a library; and
    wherein the additional code, when executed by the processor, changes a particular pointer in an address table associated with the library so that the particular pointer points to the customized function.

6. The method of claim 5, further comprising:
    determining a relocation offset value corresponding to a difference between a preferred base address and an actual load address for the library; and
    adding the relocation offset value to a preferred base address described in a load command for the library.

7. The method of claim 1, wherein the additional code, when executed by the processor, changes a pointer to the imported function in all import tables of all module dependencies of the executable file, such that each import table with a pointer to the imported function has the pointer changed to indicate the address of the customized function.

8. The method of claim 1, wherein the additional code, when executed by the processor, changes both a first pointer in a non-lazy symbol table that stores function pointers indicating addresses determined at launch time and a second pointer in a lazy symbol table that stores function pointers indicating addresses determined on first invocation of each function.

9. The method of claim 1, wherein the customized function maintains a VPN tunnel, which provides a secure and encrypted network connection.

10. The method of claim 9, wherein the secure network connection comprises at least one of: an encrypted connection, a connection to an intranet, or an exclusive connection that cannot be accessed by at least one other application.

11. The method of claim 9, connection wherein the customized function generates a VPN socket, which provides the secure network connection.

12. The method of claim 1, wherein the customized function maintains a VPN tunnel, which provides data encryption functionality.

13. The method of claim 1, communicated wherein the customized calls included in the dynamically linked libraries ensure that the application's I/O functions, network communication and file access functions comply with enterprise policies.

14. The method of claim 1, wherein the system call comprises a call to a libc library.

15. A non-transitory computer-readable storage medium storing instructions which when executed by a processor cause the processor to modify, prior to run time, an executable file of an application to cause an operating system loader to load additional code by
injecting a dynamically-linked library having the additional code into the application;
wherein the instructions that cause the executable file to be modified further comprise instructions that cause the processor to:
determine whether the executable file includes sufficient unused space to accommodate a load command;
responsive to the executable file including sufficient unused space, shift, in the executable file, an existing load command which does not contain dependency information to make space for the load command; and
add the load command to the executable file; and,
wherein the additional code, when executed by the processor, causes a change to a pointer in a table that indicates an address of an imported function implementing a system call so that the pointer indicates an address of a customized function.

16. The non-transitory computer-readable storage medium of claim 15, further comprising instructions which, when executed by the processor, cause the processor to:
compute a new signature for the executable file and replace an existing signature in the executable file with the new signature.

17. The non-transitory computer-readable storage medium of claim 15, further comprising instructions which, when executed by the processor, cause the processor to:
responsive to the executable file not including sufficient unused space, move a portion of the executable file to make space for the added load command.

18. The non-transitory computer-readable storage medium of claim 17, further comprising instructions which, when executed by the processor, cause the processor to:
change offsets in the moved portion of the executable file.

19. The non-transitory computer-readable storage medium of claim 15,
wherein the executable file imports a library; and
wherein the additional code, when executed by the processor, changes a particular pointer in an address table associated with the library so that the particular pointer points to the customized function.

20. The non-transitory computer-readable storage medium of claim 19, further comprising instructions which, when executed by the processor, cause the processor to:
determine a relocation offset value corresponding to a difference between a preferred base address and an actual load address for the library; and
add the relocation offset value to a preferred base address described in a load command for the library.

21. The non-transitory computer-readable storage medium of claim 15, wherein the additional code, when executed by the processor, changes a pointer to the imported function in all import tables of all module dependencies of the executable file, such that each import table with a pointer to the imported function has the pointer changed to indicate the address of the customized function.

22. The non-transitory computer-readable storage medium of claim 15, wherein the additional code, when executed by the processor, changes both a first pointer in a non-lazy symbol table that stores function pointers indicating addresses determined at launch time and a second pointer in a lazy symbol table that stores function pointers indicating addresses determined on first invocation of each function.

23. The non-transitory computer-readable storage medium of claim 15, wherein the customized function maintains a VPN tunnel, which provides data encryption functionality.

24. The non-transitory computer-readable storage medium of claim 23, wherein the secure network connection comprises at least one of: an encrypted connection, a connection to an intranet, or an exclusive connection that cannot be accessed by at least one other application.

25. The non-transitory computer-readable storage medium of claim 23, wherein the customized function generates a VPN socket, which provides the secure network connection.

26. The non-transitory computer-readable storage medium of claim 15, wherein the customized function maintains a VPN tunnel, which provides data encryption functionality.

27. The non-transitory computer-readable storage medium of claim 15, wherein the customized calls included in the dynamically linked libraries ensure that the application's I/O functions, network communication and file access functions comply with enterprise policies.

28. The non-transitory computer-readable storage medium of claim 15, wherein the system call comprises a call to a libc library.

29. A computing system comprising:
a processor; and
a storage device coupled to the processor storing instructions that, when executed by the processor cause the processor to:
modify, prior to run time, an executable file of an application to cause an operating system loader to load additional code by
injecting a dynamically-linked library having the additional code into the application;
wherein the instructions that cause the executable file to be modified further comprise instructions that cause the processor to:
determine whether the executable file includes sufficient unused space to accommodate a load command; and,
responsive to the executable file including sufficient unused space, shift, in the executable file, an existing load command which does not contain dependency information to make space for the load command; and
add the load command to the executable file; and,
wherein the additional code, when executed by the processor, causes the processor to change a pointer in a table that indicates an address of an imported function implementing a system call so that the pointer indicates an address of a customized function.

30. The computing system of claim 29, wherein the customized function maintains a VPN tunnel, which provides a secure and encrypted network connection.

31. The computing system of claim 30, wherein the secure network connection comprises at least one of: an encrypted connection, a connection to an intranet, or an exclusive connection that cannot be accessed by at least one other application.

32. The computing system of claim 30, wherein the customized function generates a VPN socket, which provides the secure network connection.

33. The computing system of claim 29, wherein the customized function maintains a VPN tunnel, which provides data encryption functionality.

34. The computing system of claim 29, wherein the customized calls included in the dynamically linked libraries ensure that the application's I/O functions, network communication and file access functions comply with enterprise policies.

35. The computing system of claim 29, wherein the system call comprises a call to a libc library.

36. The computing system of claim 29, wherein the storage device further comprises instructions which, when executed by the processor, cause the processor to:
compute a new signature for the executable file and replace an existing signature in the executable file with the new signature.

37. The computing system of claim 29,
wherein the executable file, when executed by the processor, imports a library; and,
wherein the additional code, when executed by the processor, changes a particular pointer in an address table associated with the library so that the particular pointer points to the customized function.

38. The computing system of claim 29, wherein the storage device further comprises instructions which, when executed by the processor, cause the processor to:
determine a relocation offset value corresponding to a difference between a preferred base address and an actual load address for the library; and
add the relocation offset value to a preferred base address described in a load command for the library.

39. The computing system of claim 29, wherein the additional code, when executed by the processor, changes a pointer to the imported function in all import tables of all module dependencies of the executable file, such that each import table with a pointer to the imported function has the pointer changed to indicate the address of the customized function.

40. The computing system of claim 29, wherein the additional code, when executed by the processor, changes both a first pointer in a non-lazy symbol table that stores function pointers indicating addresses determined at launch time and a second pointer in a lazy symbol table that stores function pointers indicating addresses determined on first invocation of each function.

41. A method, comprising:
modifying, prior to run time, an executable file of an application to cause an operating system loader to load additional code by injecting a dynamically linked library having the additional code into the application;
wherein modifying the executable file comprises:
determining whether the executable file includes sufficient unused space to accommodate a load command;
responsive to the executable file not including sufficient unused space to accommodate the load command, moving a portion of the executable file to make space for the load command; and,
adding the load command to the executable file; and,
wherein the additional code, when executed by a processor, causes the processor to change a pointer in a table that indicates an address of an imported function implementing a system call so that the pointer indicates an address of a customized function.

42. The method of claim 41, wherein responsive to the executable file of the application including sufficient unused space, shifting, in the executable file of the application, an existing load command which does not contain dependency information to make space for the load command.

43. The method of claim 41, further comprising computing a new signature for the executable file and replacing an existing signature in the executable file with the new signature.

44. The method of claim 41, further comprising changing offsets in the moved portion of the executable file.

45. The method of claim 41,
wherein the executable file imports a library; and,
wherein the additional code, when executed by a processor, changes a particular pointer in an address table associated with the library so that the particular pointer points to the customized function.

46. The method of claim 45, further comprising:
determining a relocation offset value corresponding to a difference between a preferred base address and an actual load address for the library; and
adding the relocation offset value to a preferred base address described in a load command for the library.

47. The method of claim 41, wherein the additional code, when executed by the processor, changes a pointer to the imported function in all import tables of all module dependencies of the executable file, such that each import table with a pointer to the imported function has the pointer changed to indicate the address of the customized function.

48. The method of claim 41, wherein the additional code, when executed by the processor, changes both a first pointer in a non-lazy symbol table that stores function pointers indicating addresses determined at launch time and a second pointer in a lazy symbol table that stores function pointers indicating addresses determined on first invocation of each function.

49. The method of claim 41, wherein the customized function maintains a VPN tunnel, which provides a secure and encrypted network connection.

50. The method of claim 49, wherein the secure network connection comprises at least one of: an encrypted connection, a connection to an intranet, or an exclusive connection that cannot be accessed by at least one other application.

51. The method of claim 49, wherein the customized function generates a VPN socket, which provides the secure network connection.

52. The method of claim 41, wherein the customized function maintains a VPN tunnel, which provides data encryption functionality.

53. The method of claim 41, wherein the customized calls included in the dynamically linked libraries ensure that the application's I/O functions, network communication and file access functions comply with enterprise policies.

54. The method of claim 41, wherein the system call comprises a call to a libc library.

55. A non-transitory computer-readable storage medium storing instructions which, when executed by a processor, cause the processor to:
modify, prior to run time, an executable file of an application to cause an operating system loader to load additional code by injecting a dynamically linked library having the additional code into the application;
wherein the instructions that cause the executable file to be modified further comprise instructions that cause the processor to:
determine whether the executable file includes sufficient unused space to accommodate a load command;
responsive to the executable file not including sufficient unused space to accommodate the load command, move a portion of the executable file to make space for the load command; and,
add the load command to the executable file; and,
wherein the additional code, when executed by the processor causes a change to a pointer in a table that indicates an address of an imported function implementing a system call so that the pointer indicates an address of a customized function.

56. The non-transitory computer-readable storage medium of claim 55, further comprising instructions which, when executed by the processor, cause the processor to:
responsive to the executable file including sufficient unused space, shift, in the executable file, an existing load command which does not contain dependency information to make space for the load command.

57. The non-transitory computer-readable storage medium of claim 55, further comprising instructions which, when executed by the processor, cause the processor to:
compute a new signature for the executable file and replace an existing signature in the executable file with the new signature.

58. The non-transitory computer-readable storage medium of claim 55, further comprising instructions which, when executed by the processor, cause the processor to:
responsive to the executable file not including sufficient unused space, move a portion of the executable file to make space for the added load command.

59. The non-transitory computer-readable storage medium of claim 58, further comprising instructions which, when executed by the processor, cause the processor to:
change offsets in the moved portion of the executable file.

60. The non-transitory computer-readable storage medium claim 55,
wherein the executable file imports a library: and
wherein the additional code, when executed by the processor, changes a particular pointer in an address table associated with the library so that the particular pointer points to the customized function.

61. The non-transitory computer-readable storage medium of claim 60, further comprising instructions which, when executed by the processor, cause the processor to:
determine a relocation offset value corresponding to a difference between a preferred base address and an actual load address for the library: and
add the relocation offset value to a preferred base address described in a load command for the library.

62. The non-transitory computer-readable storage medium of claim 55, wherein the additional code, when executed by the processor, changes a pointer to the imported function in all import tables of all module dependencies of the executable file, such that each import table with a pointer to the imported function has the pointer changed to indicate the address of the customized function.

63. The non-transitory computer-readable storage medium of claim 55, wherein thee additional code, when executed by the processor, changes both a first pointer in a non-lazy symbol table that stores function pointers indicating addresses determined at launch time and a second pointer in a lazy symbol table that stores function pointers indicating addresses determined on first invocation of each function.

64. The non-transitory computer-readable storage medium of claim 55, wherein the customized function maintains a VPN tunnel, which provides a secure and encrypted network connection.

65. The non-transitory computer-readable storage medium of claim 64, wherein the secure network connection comprises at least one of: an encrypted connection, a connection to an tntranet, or an exclusive connection that cannot be accessed by at least one other application.

66. The non-transitory computer-readable storage medium of claim 64, wherein the customized function generates a VPN socket, which provides the secure network connection.

67. The non-transitory computer-readable storage medium of claim 55, wherein the customized function maintains a VPN tunnel, which provides data encryption functionality.

68. The non-transitory computer-readable storage medium of claim 55, wherein the customized calls included in the dynamically linked libraries ensure that the application's I/O functions, network communication and file access functions comply with enterprise policies.

69. The non-transitory computer-readable storage medium claim 55, wherein the system call comprises a call to a libc library.

70. A computing system comprising:
a processor; and
a storage device coupled to the processor storing instructions that, when executed by the processor, cause the processor to:
modify, prior to run time, an executable file of an application to cause an operating system loader to load additional code by injecting a dynamically linked library having the additional code into the application;
wherein the instructions that cause the executable file to be modified further comprise instructions that cause the processor to:
determine whether the executable file includes sufficient unused space to accommodate a load command;
responsive to the executable file not including sufficient unused space to accommodate the load command, move a portion of the executable file to make space for the load command; and,
add the load command to the executable file; and,
wherein the additional code, when executed by the processor, causes the processor to change a pointer in a table that indicates an address of an imported function implementing a system call so that the pointer indicates an address of a customized function.

71. The computing system of claim 70, wherein the storage device further comprises instructions which, when executed by the processor, cause the processor to:
responsive to the executable file including sufficient unused space, shift, in the executable file, an existing load command which does not contain dependency information to make space for the added load command.

72. The computing system of claim 70, wherein the customized function maintains a VPN tunnel, which provides a secure and encrypted network connection.

73. The computing system of claim 72, wherein the secure network connection comprises at least one of: an encrypted connection, a connection to an intranet, or an exclusive connection that cannot be accessed by at least one other application.

74. The computing system of claim 72, wherein the customized function generates a VPN socket, which provides the secure network connection.

75. The computing system of claim 70, wherein the customized function maintains a VPN tunnel, which provides data encryption functionality.

76. The computing system of claim 70, wherein the customized calls included in the dynamically linked libraries ensure that the application's I/O functions, network communication and file access functions comply with enterprise policies.

77. The computing system of claim 70, wherein the system call comprises a call to a libc library.

78. The computing system of claim 70, wherein the storage device further comprises instructions which, when executed by the processor, cause the processor to:

compute a new signature for the executable file and replacing an existing signature in the executable file with the new signature.

79. The computing system of claim 70, wherein the executable file, when executed by the processor, imports a library; and wherein the additional code, when executed by the processor, changes a particular pointer in an address table associated with the library so that the particular pointer points to the customized function.

80. The computing system of claim 70, wherein the storage device further comprises instructions which, when executed by the processor, cause the processor to:
- determine a relocation offset value corresponding to a difference between a preferred base address and an actual load address for the library; and
- add the relocation offset value to a preferred base address described in a load command for the library.

81. The computing system of claim 70, wherein the additional code, when executed by the processor, changes a pointer to the imported function in all import tables of all module dependencies of the executable file, such that each import table with a pointer to the imported function has the pointer changed to indicate the address of the customized function.

82. The computing system of claim 70, wherein the additional code, when executed by the processor, changes both a first pointer in a non-lazy symbol table that stores function pointers indicating addresses determined at launch time and a second pointer in a lazy symbol table that stores function pointers indicating addresses determined on first invocation of each function.

* * * * *